(12) United States Patent  (10) Patent No.: US 7,884,497 B2
Sasaki et al.  (45) Date of Patent: Feb. 8, 2011

(54) POWER SUPPLY CIRCUIT

(75) Inventors: Makoto Sasaki, Kanagawa (JP);
Kentaro Tanaka, Kanagawa (JP);
Takafumi Natsume, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 177 days.

(21) Appl. No.: 12/379,170

(22) Filed: Feb. 13, 2009

(65) Prior Publication Data
US 2009/0206664 A1 Aug. 20, 2009

(30) Foreign Application Priority Data
Feb. 20, 2008 (JP) .............................. 2008-039414

(51) Int. Cl.
*H02J 1/00* (2006.01)
(52) U.S. Cl. ........................................................ 307/31
(58) Field of Classification Search .................... 307/31
See application file for complete search history.

(56) References Cited

U.S. PATENT DOCUMENTS

| | | | | |
|---|---|---|---|---|
| 5,991,168 | A * | 11/1999 | Farrington et al. | 363/16 |
| 6,075,295 | A * | 6/2000 | Li | 307/39 |
| 6,469,479 | B2 * | 10/2002 | Kim | 323/267 |
| 6,903,535 | B2 * | 6/2005 | Liu et al. | 323/222 |
| 7,208,886 | B2 * | 4/2007 | Hsieh et al. | 315/291 |
| 7,336,507 | B2 * | 2/2008 | Inukai | 363/21.15 |
| 7,586,762 | B2 * | 9/2009 | Hsu | 363/21.12 |
| 2007/0262760 | A1 * | 11/2007 | Liu | 323/282 |

FOREIGN PATENT DOCUMENTS

| | | |
|---|---|---|
| JP | 2004-4609 | 1/2004 |
| WO | WO 02/061931 | 8/2002 |

* cited by examiner

*Primary Examiner*—Jared J Fureman
*Assistant Examiner*—Adi Amrany
(74) *Attorney, Agent, or Firm*—McGinn IP Law Group, PLLC

(57) ABSTRACT

Provided is a power supply circuit generating a desired voltage by voltage multiplication, and satisfying both a demand to reduce current consumption and a demand to enable operation with a low power voltage at the same time. A power supply circuit of the present invention includes: a voltage generating circuit for generating internal voltages VI1 and VI2 from a power supply voltage VDD; a voltage step-up/down circuit for generating voltages VO1 to VO3 each having a different level by multiplying the internal voltages VI1 and VI2; and a voltage comparison circuit for comparing the voltage VO2 with the power supply voltage VDD. The voltage generating circuit is configured to select one of the internal voltages VI1 and VI2 according to an output of the voltage comparison circuit. Additionally, a voltage multiplication rate of the voltage multiplication circuit is switched according to the output of the voltage comparison circuit.

15 Claims, 16 Drawing Sheets

Fig. 7

| | PHASE "1" (S1 : ON) | PHASE "2" (S2 : ON) | PHASE "3" (S3 : ON) |
|---|---|---|---|
| VI1 SELECTION | CHARGE VI1 (= Va*) TO CAPHL AND CAP 1 | CHARGE VOLTAGES OF CAPHL + CAP 1 TO CAP 2 | CHARGE VOLTAGES OF CAPHL + CAP 2 TO CAP 3 |
| VI2 SELECTION | CHARGE VOLTAGE OF CAPHL TO CAP 1 | CHARGE VI2 (= 2Va*) TO CAP 2 CONNECT CAPHL AND CAP 1 IN SERIES AND CHARGE VI2/2 TO EACH OF CAPHL AND CAP 1 | CHARGE VOLTAGES OF CAPHL + CAP 2 TO CAP 3 |

Fig. 15

| | PHASE "1" (S1 : ON) | PHASE "2" (S2 : ON) | PHASE "3" (S3 : ON) |
|---|---|---|---|
| VDD<V02 (VI=Va*) | CHARGE VI (=Va*) TO CAPHL AND CAP 1 | CHARGE VOLTAGES OF CAPHL + CAP 1 TO CAP 2 | CHARGE VOLTAGES OF CAPHL + CAP 2 TO CAP 3 AND CAP 32 |
| VDD<V02<V03 (VI=2Va*) | CHARGE VOLTAGE OF CAPHL TO CAP 1 | CHARGE VI(=2Va*) TO CAP 2 CONNECT CAPHL AND CAP 1 IN SERIES AND CHARGE VI/2 TO EACH OF CAPHL AND CAP 1 | CHARGE VOLTAGES OF CAPHL + CAP 2 TO CAP 3 AND CAP 32 |
| V03<VDD (VI=3Va*) | CHARGE VOLTAGE OF CAPHL TO CAP 1 | CHARGE VOLTAGES OF CAPHL + CAP 1 TO CAP 2 | CHARGE VI (= 3Va*) TO CAP 3 CONNECT CAPHL + CAP 2 AND CAP 2 IN SERIES AND CHARGE VI/3 TO CAPHL |

POWER SUPPLY CIRCUIT

BACKGROUND OF THE INVENTION

1. Field of the Invention

The present invention relates to a power supply circuit, and particularly relates to a power supply circuit that generates a desired output voltage by voltage multiplication.

2. Description of the Related Art

Within a semiconductor integrated circuit, there has been widely used a voltage step-up/down circuit that performs voltage multiplication of a power supply voltage to generate a desired voltage. For example, in a liquid crystal driver that drives a LCD (Liquid Crystal Display) panel, the voltage step-up/down circuit performs voltage multiplication of an internal reference power supply voltage Vci to thereby generate a drive voltage of the liquid crystal display panel. To be specific, Japanese Patent Application Publication No. 2004-4609 discloses a technique in which a capacitor and a switch quadruple an internal reference power supply voltage Vci to generate a voltage V0; and then the voltage V0 is voltage-divided to thereby generate voltages V1 to V4. Moreover, International Patent Publication Application WO2002/061931 discloses a boost type power supply circuit including: a differential amplifier that generates a reference voltage Va; and a charge pump that generates an output voltage Vout having a voltage level of Va+2 VDD from the reference voltage Va and a power supply voltage VDD. The reference voltage Va is controlled by feeding back the output voltage Vout. More specifically, the differential amplifier compares a voltage obtained by voltage-dividing the output voltage Vout with a reference voltage Vref to generate the reference voltage Va.

However, such known voltage step-up/down circuits cannot satisfy both a demand to reduce current consumption and a demand to enable operation with a low power voltage at the same time. For example, consider a case of a liquid crystal driver. Assuming that a drive voltage of the liquid crystal display panel is Vo and that a drive current is Io, the power consumption in the liquid crystal display panel is generally expressed as Vo×Io. Therefore, if the drive voltage Vo is obtained by tripling an internal reference power supply voltage Vci, a current three times as large as the drive current Io (that is, 3Io) is consumed in an internal power supply circuit that generates the internal reference power supply voltage Vci.

If the multiplication rate for voltage multiplication is reduced, it is possible to reduce power consumption in the internal power supply circuit that generates the internal reference power supply voltage Vci. For example, when the drive voltage Vo is generated by doubling the internal reference power supply voltage Vci, a current consumed in the internal power supply circuit that generates the internal reference power supply voltage Vci is reduced to a current only twice as large as the drive current Io (that is, 2Io). However, in this case, the internal reference power supply voltage Vci must be increased in order to generate the necessary drive voltage Vo.

The aforementioned problem is generally applied to any circuits, which obtain a desired voltage by voltage multiplication, other than that for the liquid crystal driver.

SUMMARY

The present invention seeks to solve one or more of the above problems, or to improve upon those problems at least in part. According to one aspect of the present invention, a power supply circuit includes: a voltage generating circuit that generates an internal voltage from a power supply voltage; a voltage multiplication circuit that performs voltage multiplication of the internal voltage to thereby generate a plurality of output voltages each having a different voltage level; and a voltage comparison circuit that compares at least one output voltage of the plurality of output voltages with the power supply voltage. The voltage generating circuit is configured to change the internal voltage according to the output of the voltage comparison circuit. In addition, a multiplication rate for voltage multiplication in the voltage multiplication circuit is switched according to the output of the voltage comparison circuit. In the above-configured power supply circuit, when the power supply voltage is high, the multiplication rate for voltage multiplication performed by the voltage multiplication circuit is reduced to allow a reduction in current consumption. In contrast, when the power supply voltage is low, the multiplication rate is increased to maintain the operation of the power supply circuit.

According to the present invention, in the power supply circuit that generates a desired voltage by voltage multiplication, it is possible to satisfy both a demand to reduce current consumption and a demand to enable operation with a low power voltage at the same time.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 7 is a table illustrating an operation of the voltage step-up/down circuit in FIG. 4.

FIG. 15 is a table illustrating an operation of the voltage step-up/down circuit in FIG. 14.

DESCRIPTION OF THE PREFERRED EMBODIMENTS

Figure 1:
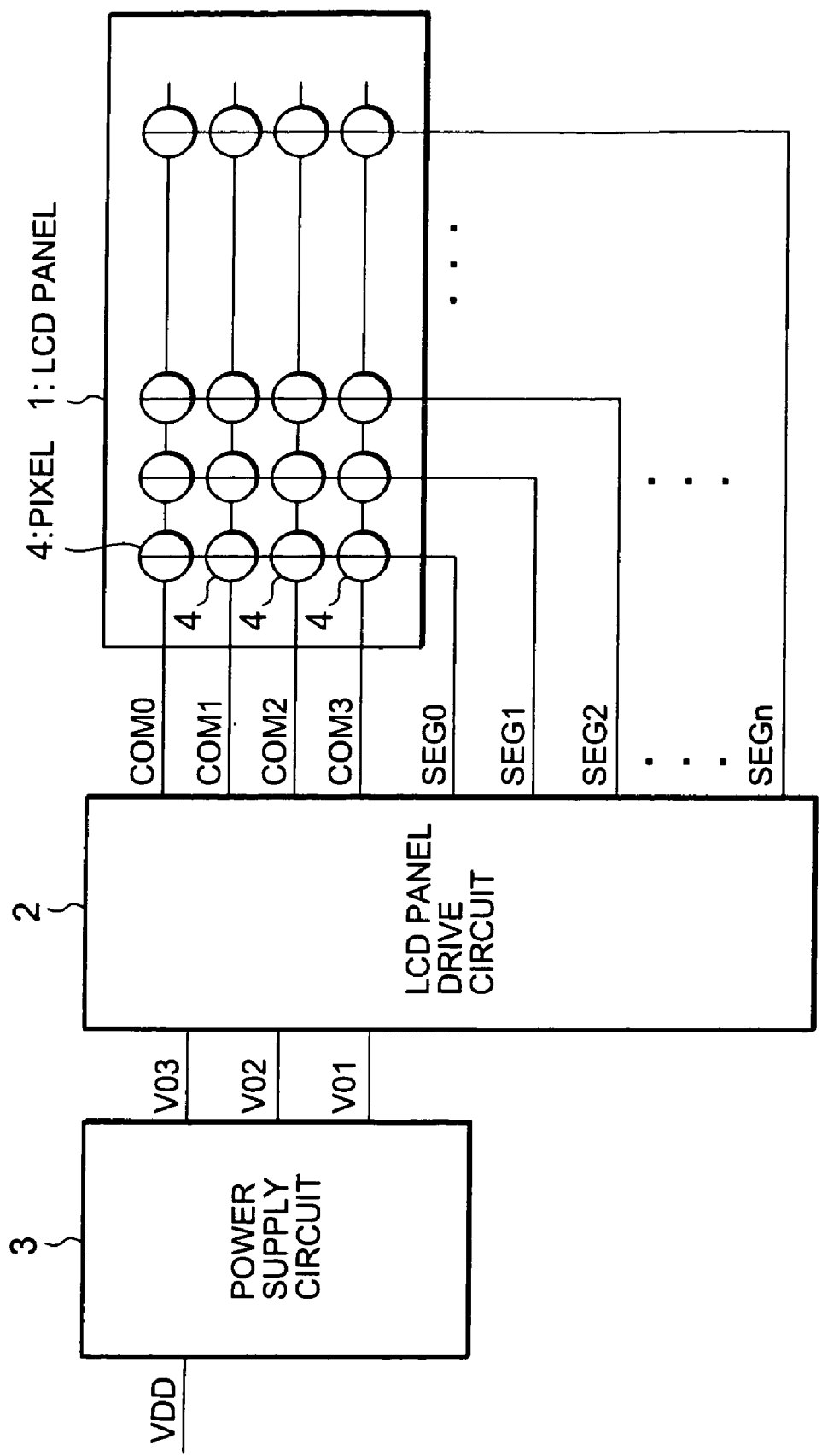
FIG. 1 is a block diagram illustrating a configuration of a liquid crystal display device in one embodiment of the present invention.

FIG. 1 is a block diagram illustrating a configuration of a liquid crystal display device 10 to which a power supply circuit of one embodiment of the present invention is applied. The liquid crystal display device 10 includes a LCD panel 1, a LCD panel drive circuit 2 and a power supply circuit 3. The LCD panel 1 is provided with common electrodes COM0 to COMm and segment electrodes SEG0 to SEGn, and pixels 4 are provided at positions where they cross one another. The LCD panel drive circuit 2 drives the common electrodes COM0 to COMm and the segment electrodes SEG0 to SEGn. The power supply circuit 3 generates voltages VO1 to VO3 from a power voltage VDD, and supplies the voltages VO1 to VO3 to the LCD panel drive circuit 2. Herein, the voltages VO1 to VO3 are generated so as to establish the following relationships, where Va* is a predetermined voltage:

$$VO1=Va^*, \quad (1a)$$

$$VO2=2\times Va^*(=2\times VO1), \text{ and} \quad (1b)$$

$$VO3=3\times Va^*(=3\times VO1) \quad (1c)$$

The LCD panel drive circuit 2 drives the common electrodes COM0 to COMm and the segment electrodes SEG0 to SEGn by using the voltages VO1 to VO3 received from the power supply circuit 3.

Figure 2A:
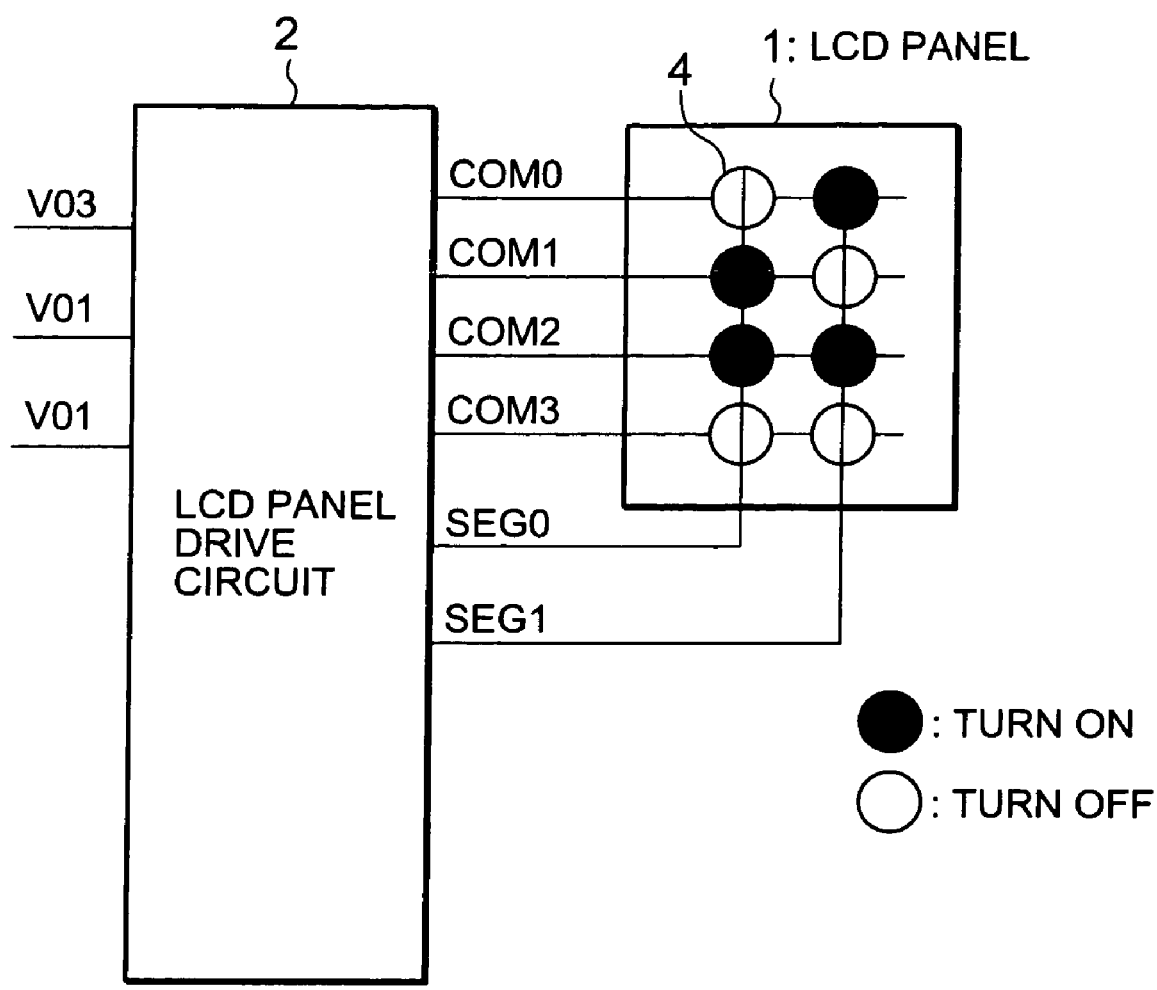
FIG. 2A is a conceptual view illustrating an operation of the liquid crystal display device in FIG. 1.
Figure 2B:
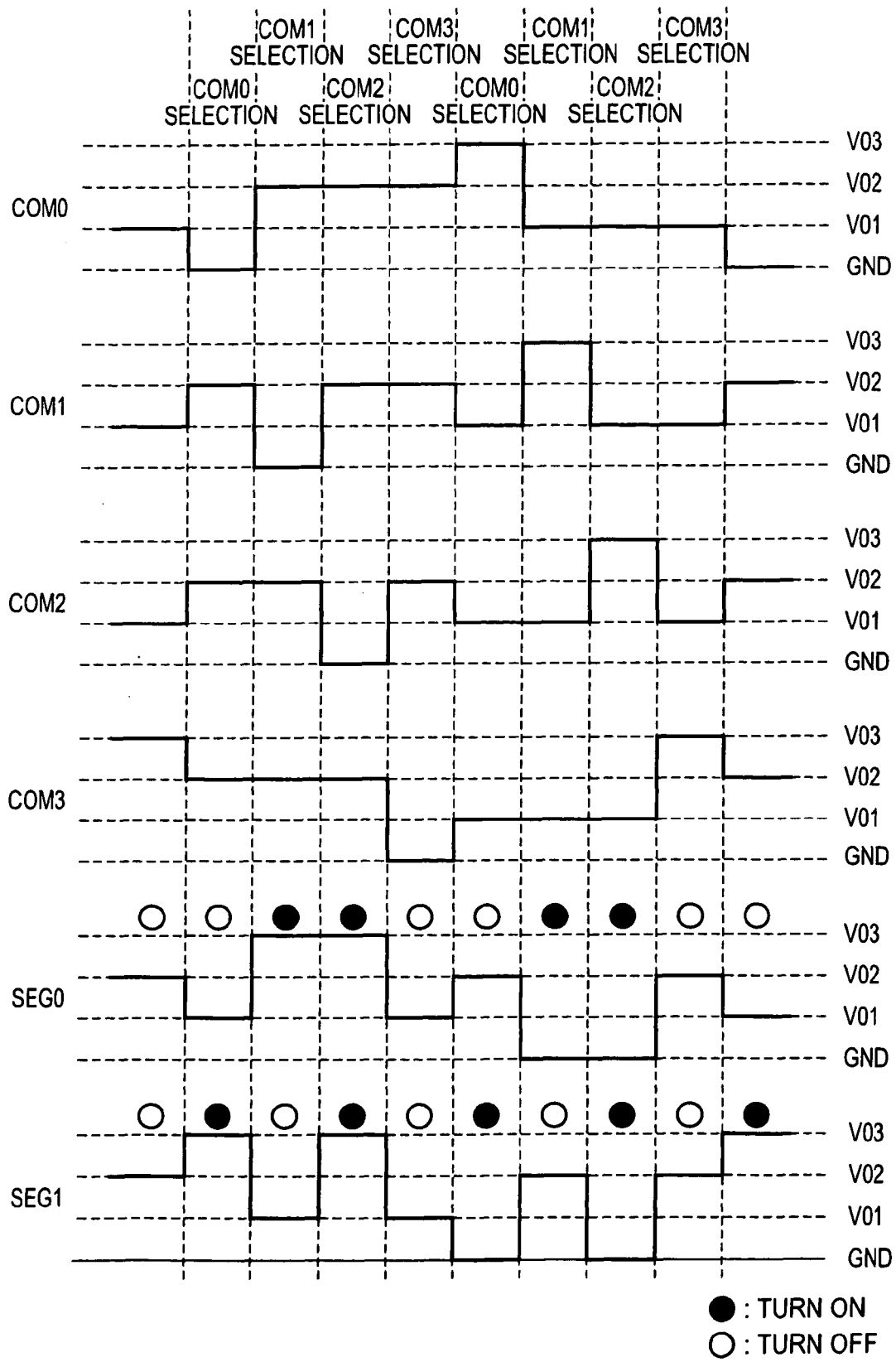
FIG. 2B is a timing chart illustrating the operation of the liquid crystal display device in FIG. 1.

FIG. 2A is a conceptual view illustrating an operation of the LCD panel drive circuit 2, and FIG. 2B is a timing chart illustrating an operation example of the LCD panel drive circuit 2. The LCD panel drive circuit 2 drives the common electrodes COM to COMm and the segment electrodes SEG0 to SEGn to a ground voltage GND or voltages VO1 to VO3. Specifically, for a first four-horizontal scanning period, the LCD panel drive circuit 2 drives: a selected common electrode to the ground voltage GND; a non-selected common electrode to the voltage VO2; a segment electrode which corresponds to the pixel 4 to be turned on to the voltage VO3; and a segment electrode which corresponds to the pixel 4 to be turned off to the voltage VO1. On the other hand, for the next four-horizontal scanning period, the LCD panel drive circuit 2 drives: a selected common electrode to the voltage VO3; anon-selected common electrode to the voltage VO1; a segment electrode which corresponds to the pixel 4 to be turned on to the ground voltage GND; and a segment electrode which corresponds to the pixel 4 to be turned off to the voltage VO2. The aforementioned operation of the LCD panel drive circuit 2 causes the LCD panel 1 to be driven by an alternate current.

The main subject of the present embodiment lies in the configuration of the power supply circuit 3 that generates voltages VO1 to VO3 from the power supply voltage VDD. The following will specifically explain the power supply circuit 3.

Figure 3:
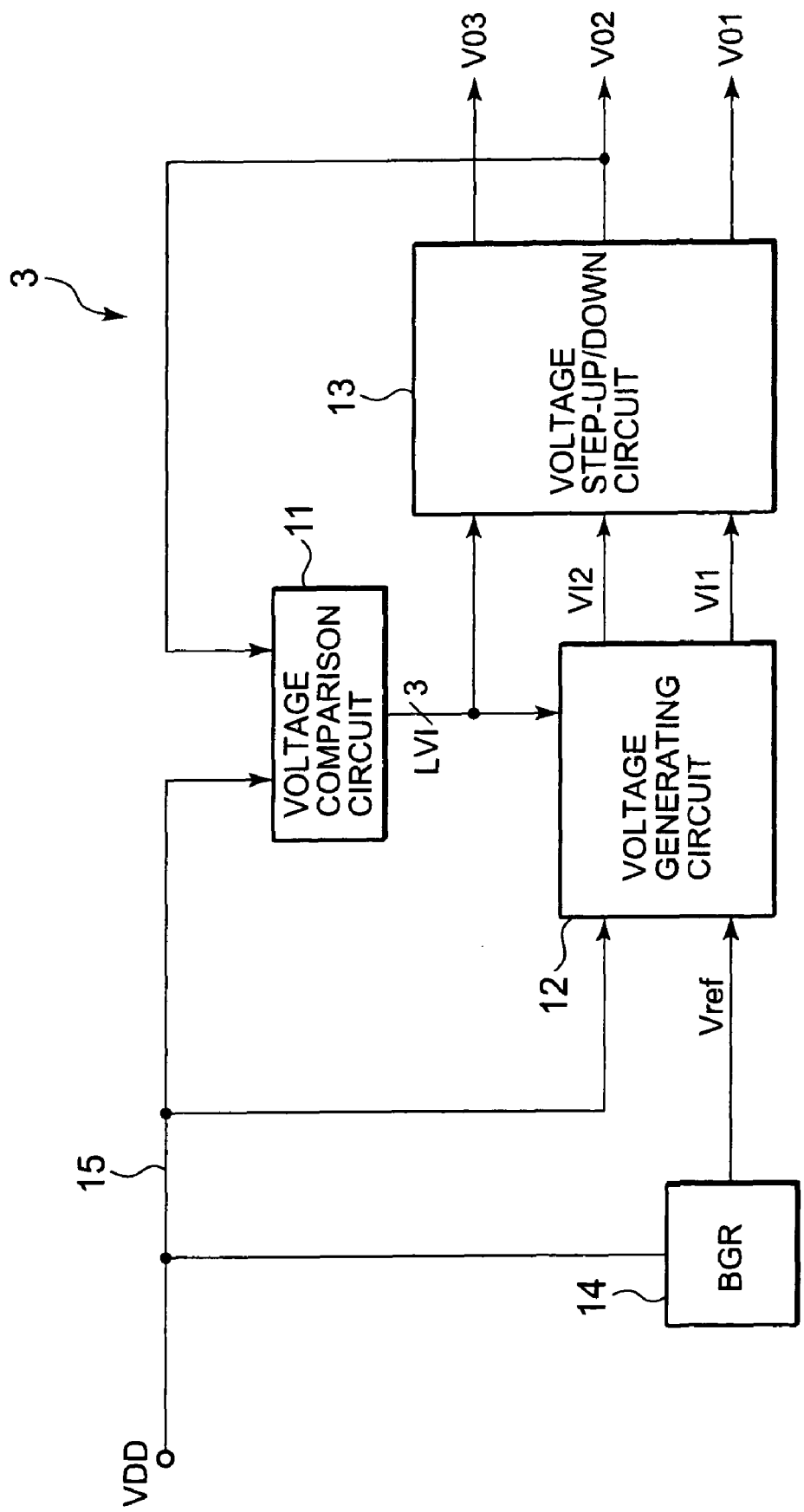
FIG. 3 is a block diagram illustrating a configuration of a power circuit in one embodiment of the present invention.

FIG. 3 is a block diagram illustrating the principle configuration of the power supply circuit 3 in the present embodiment. The power circuit 3 includes a voltage comparison circuit 11, a voltage generating circuit 12, a voltage step-up/down circuit 13, and a band-gap reference circuit 14.

The voltage comparison circuit 11 performs comparison between the VO2 and the power supply voltage VDD among three output voltages of the power supply circuit 3: voltages VO1 to VO3, and generates a control signal LVI according to a comparison result.

In the present embodiment, when VDD−VO2>Vofs is established, the control signal LVI is set to "High" level. When VDD−VO2<Vofs is established, the control signal LVI is set to "Low" level. Herein, Vofs is an offset voltage of the voltage comparison circuit 11 and a positive value is taken. The offset voltage Vofs is adjusted according to voltage drop caused by the voltage generating circuit 12.

The voltage generating circuit 12 generates an internal voltage VI1 or VI2 from the power supply voltage VDD supplied to a power supply line 15. Herein, internal voltages Vi1 and VI2 are voltages that satisfy the following relationship:

$$VI1<VI2<VDD.$$

To be specific, the voltage generating circuit 12 has two output terminals and is configured such that the internal voltage VI1 is outputted from one of the output terminals while and the internal voltage VI2 is outputted from the other of the output terminals. The output of the internal voltage VI1 or VI2 is selected according to the control signal LVI generated by the voltage comparison circuit 11; namely, when the control signal LVI is at a "Low" level, the voltage generating circuit 12 outputs the internal voltage I1, and when the control signal LVI is at a "High" level, the voltage generating circuit 12 outputs the internal voltage VI2. An output terminal from which no internal voltage is outputted is set to a high impedance state.

In addition, the voltage generating circuit 12 has a function of controlling the internal voltages VI1 and VI2 to desired values. To control the internal voltages VI1 and VI2, a reference voltage Vref supplied from the band-gap reference circuit 14 is used.

The voltage step-up/down circuit 13 performs voltage multiplication of the internal voltages VI1 and VI2 supplied from the voltage generating circuit 12 to generate voltages VO1 to VO3. In the present specification, voltage multiplication indicates to generate voltage n times as high as a given voltage (n is a positive number). A parameter n is hereinafter referred to as a multiplication rate. It should be noted that the voltage multiplication mentioned in the present specification is defined as a concept including both stepping up and down voltages; namely, voltage multiplication in which the multiplication rate n exceeds 1 means that voltage is stepped up, while voltage multiplication in which the multiplication rate n is below 1 means that voltage is stepped down.

Specifically, the voltage step-up/down circuit 13 has two input terminals, and receives: the internal voltage VI1 from one of the input terminals; and the internal voltage VI2 from the other of the input terminals. The voltage step-up/down circuit 13 is configured to voltage-multiply the received internal voltage with a different multiplication rate, depending on from which input terminal the internal voltage is received. Upon receipt of the internal voltage VI1, the voltage step-up/down circuit 13 performs voltage multiplication of the internal voltage VI1 with a higher multiplication rate than in a case where the internal voltage VI2 is received. Regarding from which input terminal the voltage step-up/down circuit 13 receives the internal voltage, it is determined according to the control signal LVI outputted from the voltage comparison circuit 11. As a result, the voltage multiplication in the voltage step-up/down circuit 13 is switched in response to the control signal LVI.

In one embodiment, Upon receipt of the internal voltage VI1, the voltage step-up/down circuit 13 is configured to output the same voltage as the internal voltage VI1 as the voltage VO1, a voltage twice as high as the internal voltage VI1 as the voltage VO2, and a voltage three times as high as the internal voltage VI1 as the voltage VO3. On the other hand, Upon receipt of the internal voltage VI2, the voltage step-up/down circuit 13 outputs a voltage ½ times as high as the internal voltage VI2 as the voltage VO1, the same voltage as the internal voltage VI2 as the voltage VO2, and a voltage 1.5 times as high as the internal voltage VI2 as the voltage VO3.

In this case, if the internal voltages VI1 and VI2 are generated so as to establish the following equations:

$$VI1=Va^*, \quad (2a)$$

$$VI2=2\times Va^*, \quad (2b)$$

then the voltages VO1 to VO3 become, as desired, Va*, 2×Va*, and 3×Va*, respectively, even if any of the internal voltages VI1 and VI2 is supplied to the voltage step-up/down circuit 13. This is because the following relationships are established:

$$VO1=VI1=(\tfrac{1}{2})\times VI2=Va^*, \quad (3a)$$

$$VO2=2\times VI1=VI2=2\times Va^*, \text{ and} \quad (3b)$$

$$VO3=3\times VI1=1.5\times VI2=3\times Va^*. \quad (3c)$$

According to the aforementioned configuration, when the power voltage VDD is high (specifically, when VDD−VO2>vofs is established), the voltage multiplication of the voltage step-up/down circuit 13 is reduced, so that current consumption in the power supply that generates the power voltage VDD is decreased. On the other hand, when the power voltage VDD is low, the voltage multiplication of the voltage step-up/down circuit 13 is increased to generate the voltages VO1 to VO3 each having a desired voltage level, so that the power supply circuit 3 can be operated with a low power supply voltage. Thus, the power supply circuit 3 is configured so as to satisfy both a demand to reduce current consumption and a demand to enable operation with a low power voltage at the same time.

Figure 4:
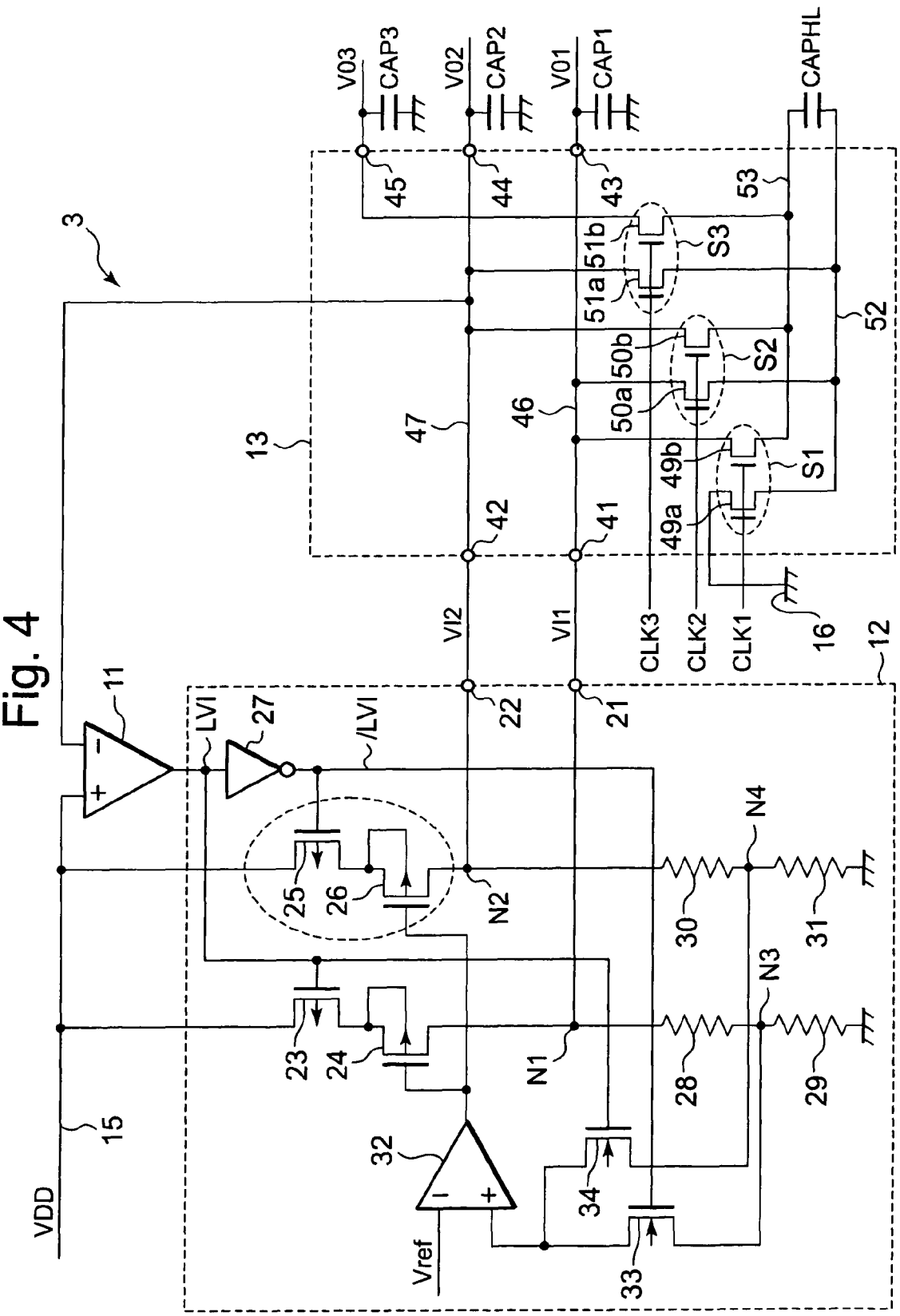
FIG. 4 is a circuit diagram illustrating one example of the configuration of the power supply circuit in FIG. 3.

The following will explain a specific configuration example of the power supply circuit 3 of the present embodiment. FIG. 4 is a circuit diagram illustrating a specific configuration example of the power supply circuit 3.

The voltage generating circuit 12 includes output terminals 21 and 22, PMOS transistors 23 to 26, an inverter 27, resistance elements 28 to 31, an operational amplifier 32, and NMOS transistors 33 and 34. Herein, the output terminals 21 and 22 are terminals that output internal voltages VI1 and VI2, respectively.

The PMOS transistors 23 and 24 are connected in series between the power supply line 15 and a node N1, and the node N1 is connected to the output terminal 21. Meanwhile, the PMOS transistors 25 and 26 are connected in series between the power supply line 15 and a node N2, and the node N2 is connected to the output terminal 22. The control signal LVI is supplied to a gate of the PMOS transistor 23 from the voltage comparison circuit 11. An inverted control signal/LVI, which is an inverted signal of the control signal LVI, is supplied to a gate of the PMOS transistor 25 from an inverter 27 which is connected to an output of the voltage comparison circuit 11.

The PMOS transistors 23 and 25 function as a selection circuit section that selects to which of the output terminals 21 and 22 the power supply line 15 is electrically connected in response to the control signal LVI.

The resistance elements 28 and 29 are connected in series between the node N1 and a ground terminal, and are used to voltage-divide the internal voltage VI1. A connection node N3 for the resistance elements 28 and 29 is connected to a non-inverting input of the operational amplifier 32 through the NMOS transistor 33. Regarding resistance values of the resistance elements 28 and 29, when the internal voltage VI1 is equal to the voltage Va*, the voltage of the node N3 is adjusted to be equal to the reference voltage Vref.

Likewise, the resistance elements 30 and 31 are connected in series between the node N2 and the ground terminal, and are used to voltage-divide the internal voltage VI2. A connection node N4 for the resistance elements 30 and 31 is connected to the non-inverting input of the operational amplifier 32 through the NMOS transistor 34. Regarding resistance values of the resistance elements 30 and 31, when the internal voltage VI2 is equal to the voltage 2Va*, the voltage of the node N4 is adjusted to be equal to the reference voltage Vref.

The control signal LVI is supplied to a gate of the NMOS transistor 33 from the voltage comparison circuit 11, and the NMOS transistor 33 is turned on and off according to the control signal LVI. Likewise, the inverted control signal /LVI is supplied to a gate of the NMOS transistor 34 from the inverter 27, and the NMOS transistor 33 is turned on and off according to the inverted control signal /LVI.

The operational amplifier 32 functions as a control circuit section that controls gate voltages of the PMOS transistors 24 and 26 according to the internal voltages VI1 and VI2. The operational amplifier 32 receives the reference voltage Vref generated by the band-gap reference circuit 14 at an inverting input, and receives a voltage which is obtained by voltage-dividing the internal voltage VI1 or VI2 at a non-inverting input. The operational amplifier 32 has a non-inverting output, and supplies, to gates of the PMOS transistors 24 and 26, a voltage according to a difference which is obtained by subtracting the reference voltage Vref from the voltage of the non-inverting input (namely, voltage which is obtained by voltage-dividing the internal voltage VI1 or VI2). The operational amplifier 32 serves to control gate voltages of the PMOS transistors 24 and 26 to thereby control the internal voltages VI1 and VI2 to voltages Va* and 2Va*, respectively.

Figure 5:
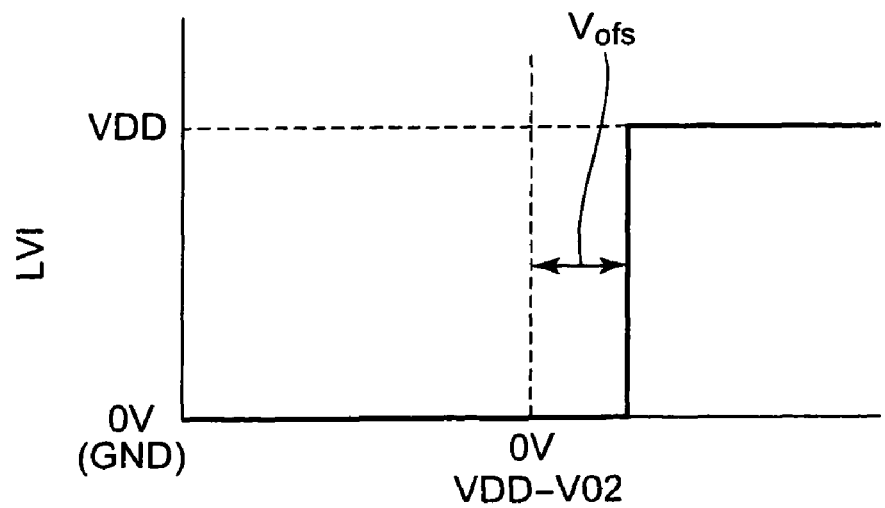
FIG. 5 is a graph illustrating an operation of a voltage comparison circuit of a power supply circuit in FIG. 4.

In a case where the voltage generating circuit 12 uses the aforementioned configuration, an offset voltage Vofs of the voltage comparison circuit 11 is set so as to be slightly higher than voltage drop caused by the PMOS transistors 25 and 26. FIG. 5 is a view illustrating a relationship between VDD−VO2 and a voltage level of the control signal LVI outputted by the voltage comparison circuit 11. When VDD−VO2>Vofs is established, the voltage level of the control signal LVI is set to VDD (namely, "High" level). Meanwhile, when VDD−VO2<Vofs is established, the voltage level of the control signal LVI is set to 0V (namely, "Low" level).

Referring back to FIG. 4, the voltage step-up/down circuit 13 includes input terminals 41 and 42, output terminals 43 to 45, inner wires 46 and 47, switches S1 to S3, and capacitor wires 52 and 53. The inner wire 46 is a wire for making connection between the input terminal 41 and the output terminal 43 within the voltage step-up/down circuit 13, and the inner wire 47 is a wire for making connection between the input terminal 42 and the output terminal 44. Each of external capacitors CAP1 to CAP3 is connected between the ground terminal and each of the output terminals 43, 44, and 45. In addition, an external capacitor CAPHL is connected between the capacitors wires 52 and 53. The external capacitors CAP 1 to CAP 3 and the CAPHL have the same capacitance. The voltage step-up/down circuit 13, the external capacitors CAP 1 to CAP 3, and the CAPHL form a voltage multiplication circuit that performs voltage multiplication of the internal voltages VI1 and VI2.

The switch S1 is a switch for connecting the capacitor CAPHL between the internal wire 46 and the ground terminal 16, and is composed of NMOS transistors 49a and 49b. The switch S2 is a switch for connecting the capacitor CAPHL between the internal wire 47 and the internal wire 46, and is composed of NMOS transistors 50a and 50b. The switch S3 is a switch for connecting the capacitor CAPHL between the internal wire 45 and the internal wire 47, and is composed of NMOS transistors 51a and 51b.

Figure 6:
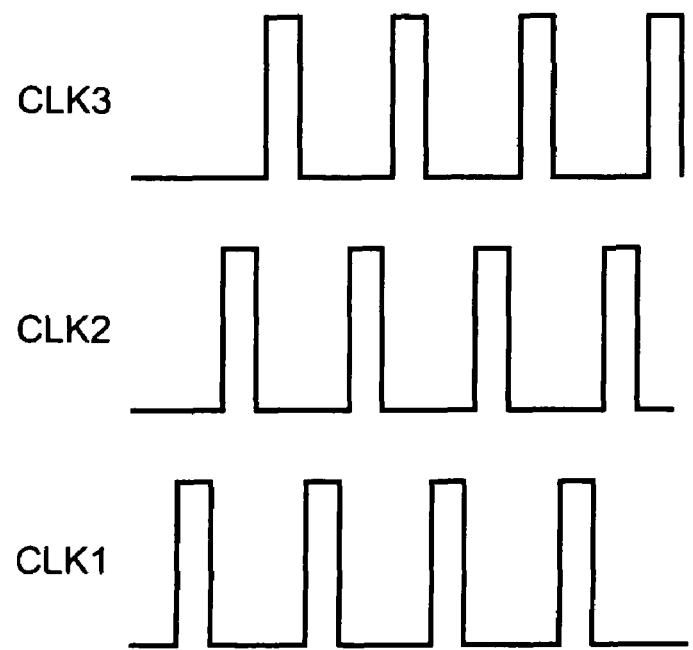
FIG. 6 is a timing chart illustrating a waveform of a voltage step-up clock supplied to a voltage step-up/down circuit of the power supply circuit in FIG. 4.

Voltage step-up clocks CLK1 to CLK3 are supplied to the switches S1 to S3, respectively. FIG. 6 is a view illustrating waveforms of the voltage step-up clocks CLK1 to CLK3. The voltage step-up clocks CLK1 to CLK3 form a multiphase clock and they are different from one another in a time period during which each voltage step-up clock is pulled up to a "High" level. When the voltage step-up clock CLK1 reaches a "High" level, the switch S1 is turned on. When the voltage step-up clock CLK2 reaches a "High" level, the switch S2 is turned on. When the voltage step-up clock CLK3 reaches a "High" level, the switch S3 is turned on. The time period during which the voltage step-up clock CLK1 is at a "High" level is hereinafter referred to as a phase "1." The time period during which the voltage step-up clock CLK2 is at a "High" level is hereinafter referred to as a phase "2." The time period during which the voltage step-up clock CLK3 is at a "High" level is hereinafter referred to as a phase "3."

The following will explain an operation of the power supply circuit 3 in FIG. 4.

(1) A Case where VDD−VO2>Vofs is Established

In this case, the voltage generating circuit 12 outputs the internal voltage VI2 from the output terminal 22; namely, the output terminal 21 is set to a high impedance state. To be more specific, the control signal LVI is set to a "High" level by the voltage comparison circuit 11, whereby the PMOS transistor 23 is turned off and the PMOS transistor 25 is turned on. Meanwhile, the NMOS transistor 34 is turned on by the control signal LVI, and therefore the internal voltage VI2 is fed back to the operational amplifier 32. The operational amplifier 32 controls a gate voltage of the PMOS transistor 26 so as to match the internal voltage VI2 with the voltage level 2Va*. By the aforementioned operation, the voltage generating circuit 12 supplies the internal voltage VI2 having the voltage level 2Va* to the voltage step-up/down circuit 13.

On the other hand, the voltage step-up/down circuit 13 receives supply of the voltage step-up clocks CLK1 to CLK3 and generates voltages VO1 to VO3 from the internal voltage VI2. Specifically, the voltage step-up/down circuit 13 outputs voltage ½ times as high as the internal voltage VI2 as the voltage VO1, the same voltage as the internal voltage VI2 as the voltage VO2, and voltage 1.5 times as high as the internal voltage VI2 as the voltage VO3.

FIG. 7 is a table specifically illustrating an operation of the voltage step-up/down circuit 13. When the internal voltage VI2 is supplied to the voltage step-up/down circuit 13, the capacitor CAP 2 is charged to the internal voltage VI2 in the phase "2". The voltage of the capacitor CAP 2, that is, voltage VO2 is made equal to the internal voltage VI2. At this time, the capacitors CAPHL and the CAP 1 are connected to each other in series, and therefore the capacitors CAPHL and the CAP 1 are each charged to voltage VI2/2. In the phase "3", an electrical charge is moved to the capacitor CAP 3 from the capacitor CAPHL such that the voltage of the capacitor CAP 3 is equal to the sum of the voltages of the capacitor CAP 2 and the capacitor CAPHL. In the phase "1", the capacitors CAPHL and the CAP 1 are connected to each other in parallel. With this configuration, the electrical charge is moved between the capacitors CAPHL and the CAP 1 such that the voltage of the capacitor CAPHL and the voltage of the CAP 1 are equal to each other. When movement of the electrical charge is stopped after repeated operations of the phases "1" to "3", the capacitor CAP 1 and the CAPHL are charged to voltage VI2/2, the capacitor CAP 2 is charged to voltage VI2, and the capacitor CAP 3 is charged to voltage of 1.5×VI2.

Here, the internal voltage VI2 is controlled so as to be equal to the voltage 2Va*, with the result that voltages VO1 to VO3 are generated so as to establish the following relationships:

$$VO1=(½)\times VI2=Va^*, \tag{4a}$$

$$VO2=VI2=2\times Va^*, \text{ and} \tag{4b}$$

$$VO3=1.5\times VI2=3\times Va^*. \tag{4c}$$

(2) A Case where VDD−VO2<Vofs is Established

In this case, the voltage generating circuit 12 outputs the internal voltage VI1 from the output terminal 21; namely, the output terminal 22 is set to a high impedance state. To be more specific, the control signal LVI is set to a "Low" level by the voltage comparison circuit 11, whereby the PMOS transistor 23 is turned on and the PMOS transistor 25 is turned off. Meanwhile, the NMOS transistor 33 is turned on by the control signal LVI, and therefore the internal voltage VI1 is fed back to the operational amplifier 32. As a consequence, a gate voltage of the PMOS transistor 24 is controlled by the operational amplifier 32 such that the internal voltage VI1 reaches a desired value Va*. By the aforementioned operation, the voltage generating circuit 12 supplies the internal voltage VI1 having the voltage level Va* to the voltage step-up/down circuit 13.

Referring to FIG. 7 again, when the internal voltage VI1 is supplied to the voltage step-up/down circuit 13, the capacitor CAPHL and the capacitor CAP 1 are charged to the internal voltage VI1 in the phase "1". In the phase "2", an electrical charge is moved to the capacitor CAP 2 from the capacitor CAPHL such that the voltage of the capacitor CAP 2 is equal to the sum of the voltages of the capacitor CAP 1 and the capacitor CAPHL. In the phase "3", an electrical charge is moved to the capacitor CAP 3 from the capacitor CAPHL such that the voltage of the capacitor CAP 3 is equal to the sum of the voltages of the capacitor CAP 2 and the capacitor CAPHL. When movement of the electrical charge is stopped after repeated operations of the phases "1" to "3", the capacitor CAP 1 and the CAPHL are charged to voltage VI1, the capacitor CAP 2 is charged to voltage of 2×VI1, and the capacitor CAP 3 is charged to voltage of 3×VI1.

Here, the internal voltage VI1 is controlled so as to be equal to the voltage Va*, with the result that voltages VO1 to VO3 are generated so as to establish the following relationships:

$$VO1=VI1=Va^*, \tag{5a}$$

$$VO2=2\times VI1=2\times Va^*, \text{ and} \tag{5b}$$

$$VO3=3\times VI1=3\times Va^*. \tag{5c}$$

As is understood from the above, the power supply circuit 3 operates so as to establish the following equations even in either of the above cases (1) and (2):

$$VO1=Va^*, \tag{1a}$$

$$VO2=2\times Va^*, \text{ and} \tag{1b}$$

$$VO3=3\times Va^*. \tag{1c}$$

In other words, when the power voltage VDD is high to an extent that VDD−VO2>vofs is established, the multiplication rate of the voltage step-up/down circuit 13 is reduced with the voltages VO1 to VO3 being maintained, so that current consumption of the power supply that generates the power voltage VDD is decreased. On the other hand, when the power voltage VDD is low to an extent that VDD−VO2<vofs is established, the multiplication rate of the voltage step-up/down circuit 13 is increased to generate the voltages VO1 to VO3 each having a desired voltage level. In other words, the power supply circuit 3 can be operated with a low power supply voltage. Thus, the power supply circuit 3 is configured so as to satisfy both a demand to reduce current consumption and a demand to enable operation with a low power voltage at the same time.

One problem of the configuration in FIG. 4 is that both output terminals 21 and 22 of the voltage generating circuit 12 are connected to the ground terminal through the resistance elements 28 to 31, and therefore a large amount of current flows into the ground terminal to increase power consumption. The following will describe a configuration for reducing power consumption of the power supply circuit 3.

Figure 8A:
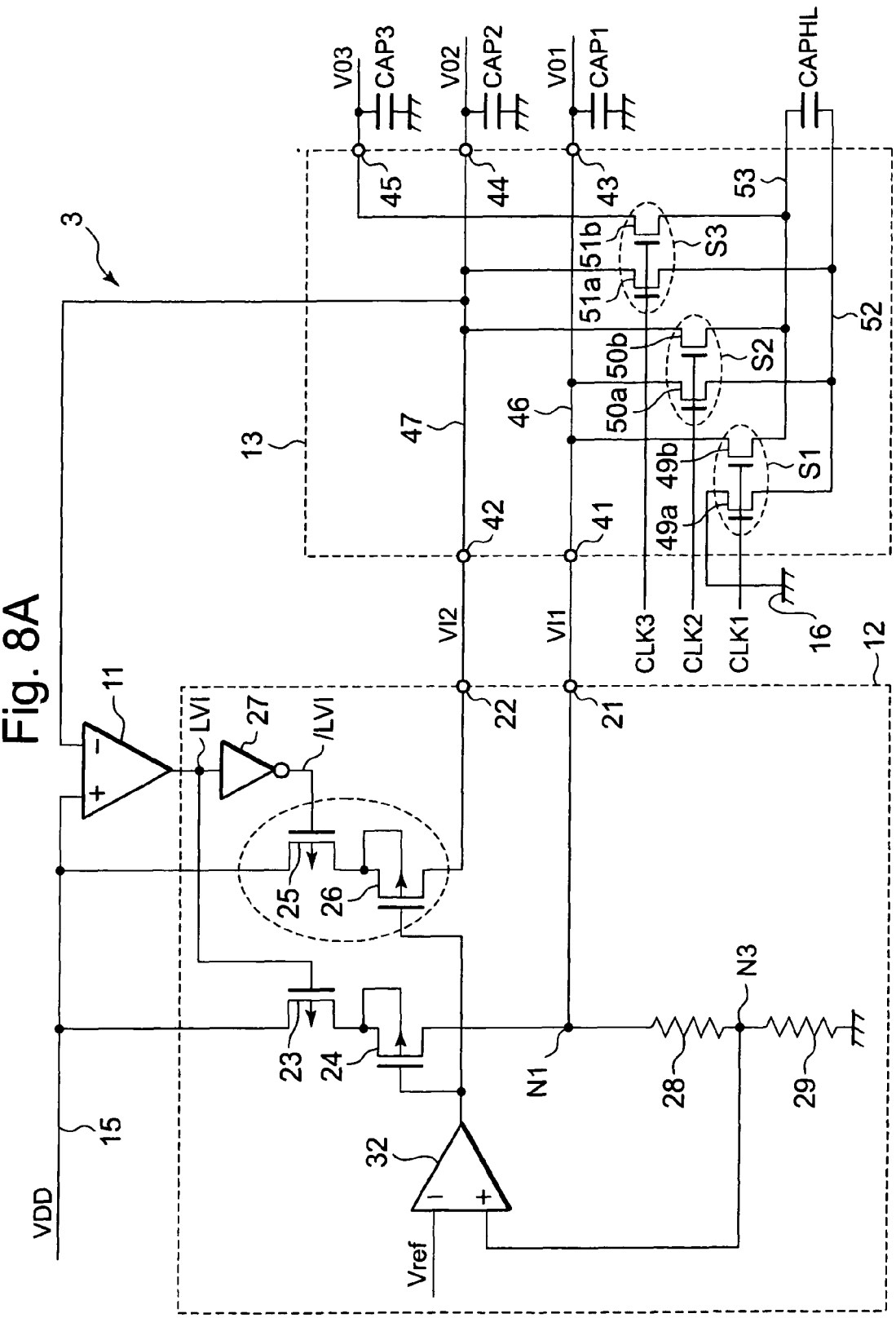
FIG. 8A is a circuit diagram illustrating another example of the configuration of the power supply circuit in FIG. 3.

FIG. 8A is a circuit diagram illustrating one example of the voltage generating circuit 12 for reducing power consumption. In the configuration in FIG. 8A, the output terminal 22 is electrically separated from the ground terminal. In other words, the resistance elements 30 and 31, which are used to feed back the internal voltage VI2 to the operational amplifier 32, are removed. That is, in the configuration in FIG. 8A, only the internal voltage VI1 is fed back to the operational amplifier 32. Accordingly, the NMOS transistors 33 and 34, which select the internal voltage to be fed back, are removed, and the connection N3 is directly connected to the operational amplifier 32.

With the configuration of FIG. 8A, only the output terminal 21 of the voltage generating circuit 12 is connected to the ground terminal, and therefore a current flowing into the ground terminal is reduced, resulting in a decrease in power consumption.

Meanwhile, in the configuration in FIG. 8A, only the function of controlling the internal voltage VI1 to voltage Va* is given to the voltage generating circuit 12 itself. In other words, the internal voltage VI2 cannot be controlled to voltage 2Va* by the voltage generating circuit 12 alone. However, in the configuration in FIG. 8A, the voltage step-up/down circuit 13 is configured to satisfy the following relationship:

$$VI1 = (1/2) \times VI2,$$

so that the internal voltage VI2 is controlled to voltage 2Va* even if the voltage generating circuit 12 controls only the internal voltage VI1.

To be specific, when the voltage generating circuit 12 outputs the internal voltage VI2 to the input terminal 42 of the voltage step-up/down circuit 13, the voltage of the input terminal 41 becomes $(1/2) \times VI2$ due to function of the voltage step-up/down circuit 13. That is, the node N1 becomes voltage of $(1/2) \times VI2$. At this time, the gate voltage of the PMOS transistor 26 is controlled by the operational amplifier 32 such that the node N1 reaches voltage Va*, with the result that the internal voltage VI2 is controlled to voltage 2Va*.

Figure 8B:
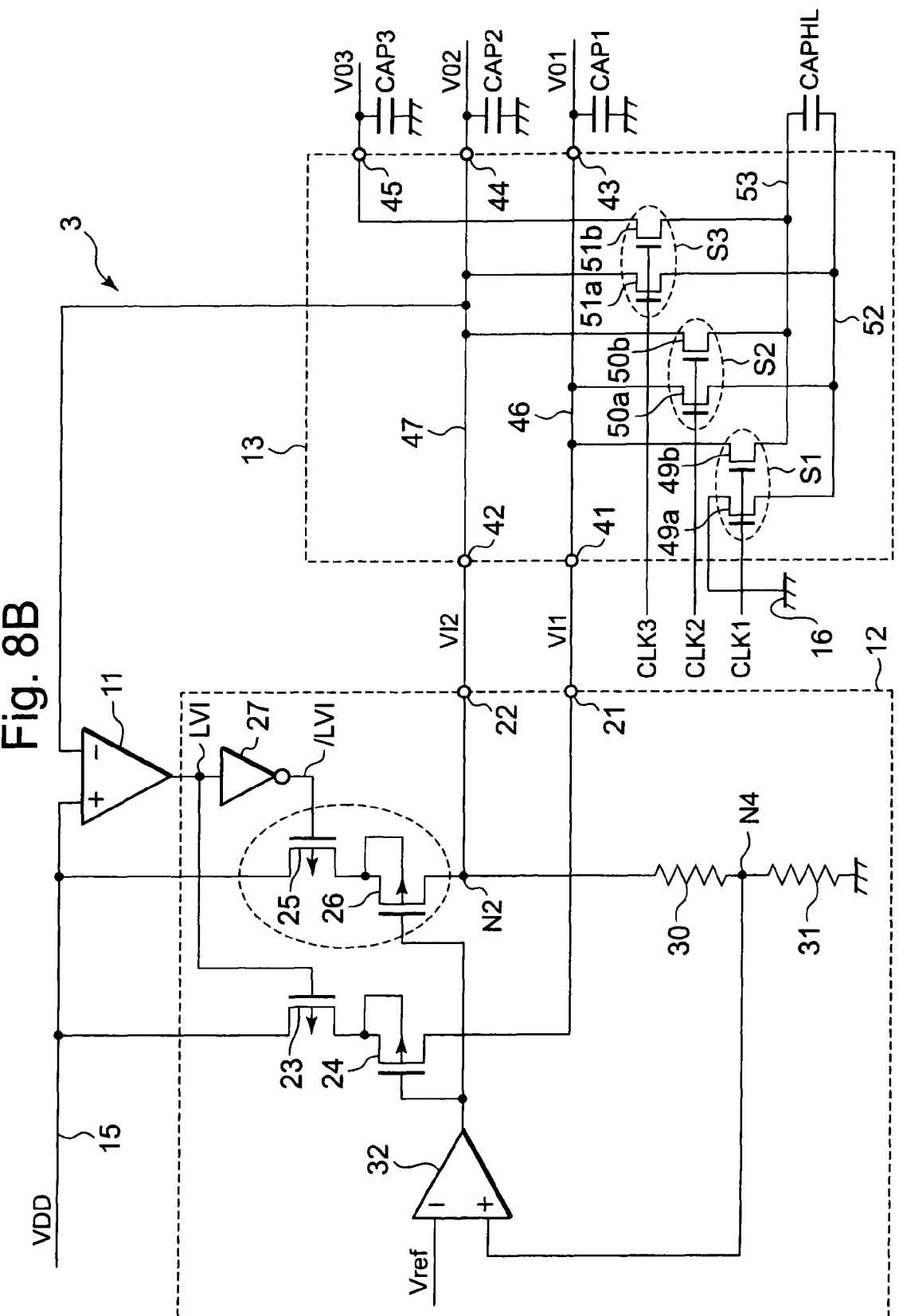
FIG. 8B is a circuit diagram illustrating further another example of the configuration of the power supply circuit in FIG. 3.

As illustrated in FIG. 8B, the output terminal 21 can be configured to be electrically separated from the ground terminal. In this case, the resistance elements 28 and 29, which are used to feedback the internal voltage VI1 to the operational amplifier 32, are removed. In other words, in the configuration in FIG. 8B, only the internal voltage VI2 is fed back to the operational amplifier 32. Accordingly, the NMOS transistors 33 and 34, which select the internal voltage to be fed back, are removed and the connection N4 is directly connected to the operational amplifier 32.

In the configuration in FIG. 8B, only the function of controlling the internal voltage VI2 to voltage 2Va* is given to the voltage generating circuit 12 itself. However, similar to the configuration in FIG. 8A, the internal voltage VI1 is controlled to voltage Va* by the operation of the voltage step-up/down circuit 13 even if the voltage generating circuit 12 controls only the internal voltage VI2. In the configuration in FIG. 8B, only the output terminal 22 of the voltage generating circuit 12 is connected to the ground terminal, and therefore a current flowing into the ground terminal is reduced, resulting in a decrease in power consumption.

Figure 9:
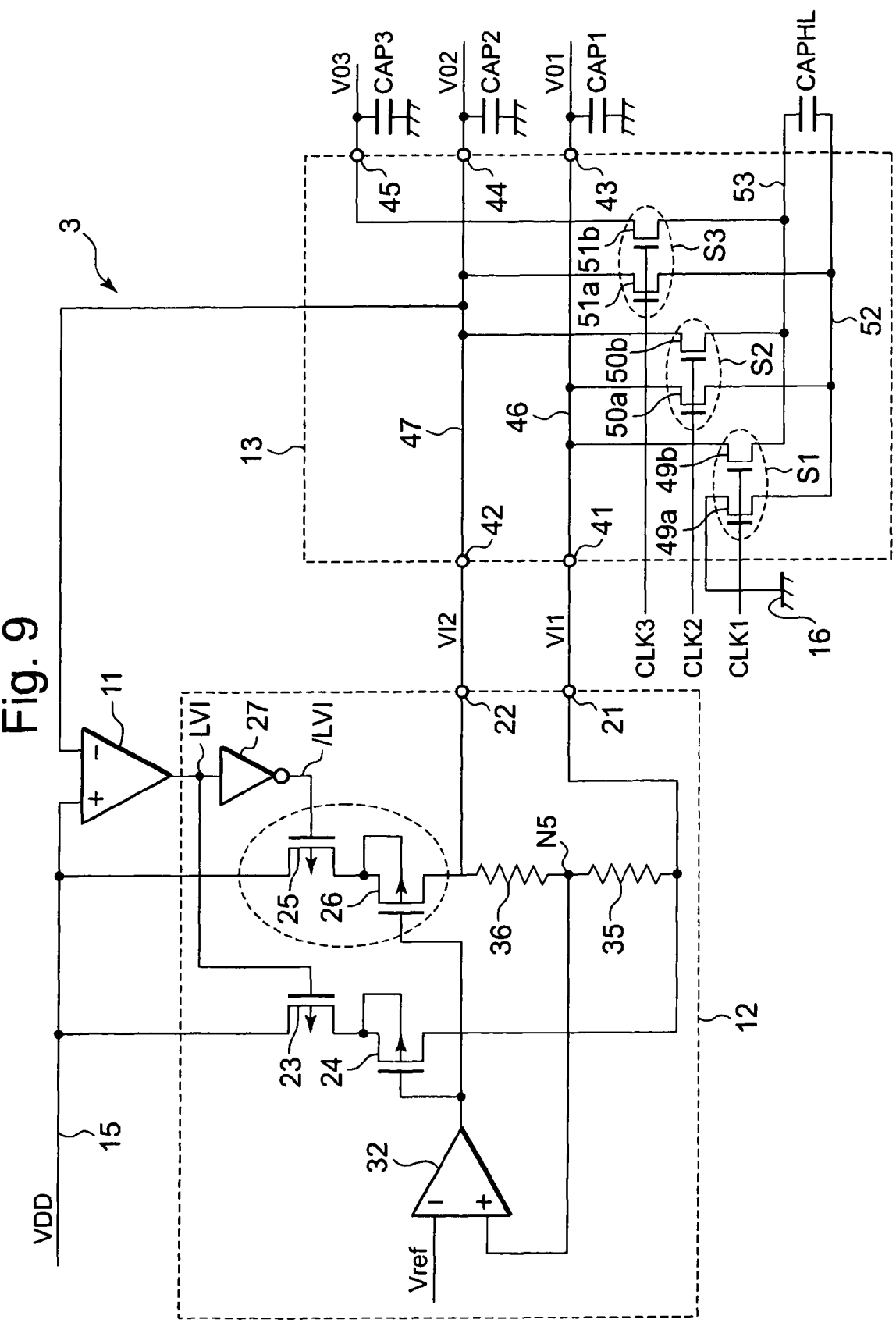
FIG. 9 is a circuit diagram illustrating still further another example of the configuration of the power supply circuit in FIG. 3.

FIG. 9 is a circuit diagram illustrating a configuration of the voltage generating circuit 12 for further reducing power consumption. In the voltage generating circuit 12 having the configuration in FIG. 9, both output terminals 21 and 22 are electrically separated from the ground terminal. To be specific, resistance elements 35 and 36 are connected in series between the output terminals 21 and 22. In other words, each of the resistance elements 28 to 31 between the ground terminal and each of the output terminals 21 and 22 is removed. A connection node N5 for the resistance elements 35 and 36 is connected to a non-inverting output of the operational amplifier 32. In the configuration in FIG. 9, both output terminals 21 and 22 of the voltage generating circuit 12 are electrically separated from the ground terminal, and therefore power consumption of the power supply circuit 3 is further reduced.

Meanwhile, in the configuration in FIG. 9, the voltage generating circuit 12 has no function of controlling the internal voltages VI1 and VI2 to voltages Va* and 2Va*, respectively, by itself. However, if resistance values of the resistance elements 35 and 36 are set to appropriate values as described later, it is possible to control the internal voltages VI1 and VI2 to voltages Va* and 2Va*, respectively, due to function of the voltage step-up/down circuit 13.

The following will review the resistance values of resistance elements 35 and 36. In the following, the resistance value of the resistance element 35 is described as R1 and the resistance value of the resistance element 36 is described as R2.

In a steady state, the input voltage of the non-inverting input of the operational amplifier 32 and that of the inverting input are substantially equal to each other, and therefore the following equation (6) is established:

$$\begin{aligned}Vref &= (VI2 - VI1) \times R1/(R1+R2) + VI1, \\ &= VI2 \times R1/(R1+R2) + VI1 \times R2/(R1+R2),\end{aligned} \qquad (6)$$

where Vref is a reference voltage supplied from the band-gap reference circuit 14.

On the other hand, the voltage step-up/down circuit 13 has a function of maintaining the internal voltages VI1 and VI2 as in the following relationship:

$$VI2 = 2 \times VI1. \qquad (7)$$

When the equation (7) is substituted into the equation (6), the following equation (8) is obtained:

$$Vref = (2 \times R1 + R2)/(R1 + R2) \times VI1, \quad (8)$$

$$\text{namely,} \quad VI1/Vref = (R1 + R2)/(2R1 + R2).$$

As is understood from the equation (8), in order to adjust the internal voltage VI1 to voltage Va*, the resistance values R1 and R2 of the resistance elements 35 and 36 may be adjusted so as to establish the following equation (9):

$$Va*/Vref=(R1+R2)/(2R1+R2). \quad (9)$$

In other words, if the resistance values R1 and R2 are adjusted so as to establish the equation (9), it is possible to control the internal voltages VI1 and VI2 to voltages Va* and 2Va*, respectively.

In the configuration in FIG. 3 and its specific examples, that is, configurations in FIG. 4, FIG. 8A, FIG. 8B and FIG. 9, the voltage generating circuit 12 is configured to exclusively output the internal voltages VI1 and VI2 from different output terminals and according to the control signal LV. Also, the voltage step-up/down circuit 13 is configured to perform voltage multiplication with a different multiplication rate depending on cases where the internal voltage VI1 is received from the input terminal 41, and where the internal voltage VI2 is received from the input terminal 42. In this configuration, which of the internal voltages VI1 and VI2 is supplied to the voltage step-up/down circuit 13 is selected in response to the control signal LVI, so that the multiplication rate in the voltage step-up/down circuit 13 is indirectly switched by the control signal LVI.

Figure 10:
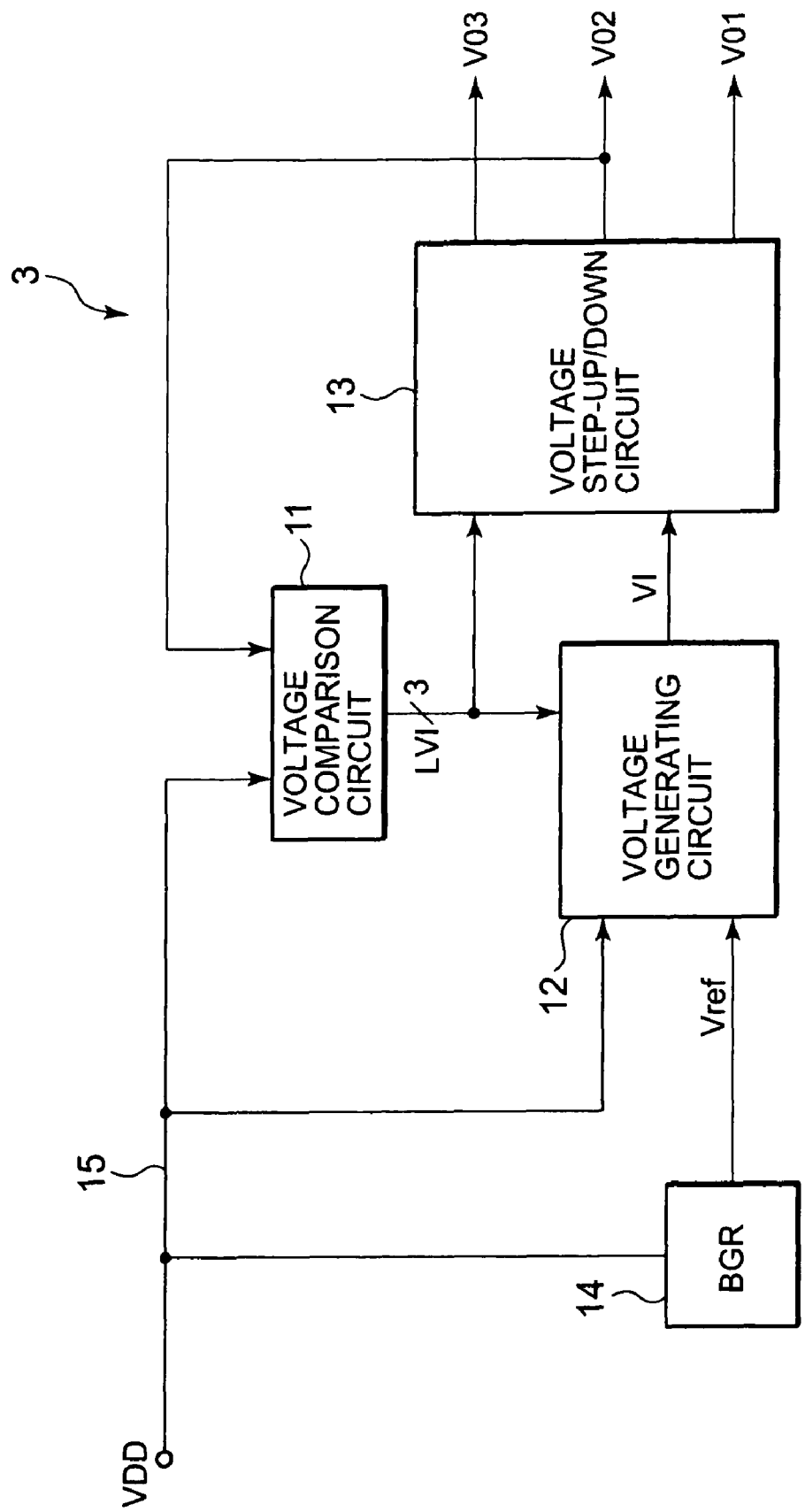
FIG. 10 is a block diagram illustrating a configuration of a power circuit in another embodiment of the present invention.

Meanwhile, as illustrated in FIG. 10, a configuration is also possible in which the control signal LVI is also supplied to the voltage step-up/down circuit 13 and the voltage multiplication rate of voltage multiplication in the voltage step-up/down circuit 13 is switched in response to the control signal LVI. In this case, the voltage generating circuit 12 controls the voltage level of the internal voltage VI according to the control signal LVI outputted from the voltage comparison circuit 11.

More specifically, when VDD−VO2<Vofs is established, the voltage comparison circuit 11 sets the control LVI to a "Low" level. The voltage generating circuit 12 controls the internal voltage VI to voltage Va* in response to the fact that the control signal LVI is set to the "Low" level. Meanwhile, the voltage step-up/down circuit 13 outputs the same voltage as the internal voltage VI as the voltage VO1, a voltage twice as high as the internal voltage VI as the voltage VO2, and a voltage three times as high as the internal voltage VI as the voltage VO3. As a result, the voltage levels of the voltages VO1, VO2, VO3 outputted from the power supply circuit 3 become Va*, 2Va*, and 3Va*, respectively.

When VDD−VO2>Vofs is established, the voltage comparison circuit 11 sets the control LVI to a "High" level. The voltage generating circuit 12 controls the internal voltage VI to voltage 2Va* in response to the fact that the control signal LVI is set to the "High" level. Meanwhile, the voltage step-up/down circuit 13 outputs a voltage ½ times as high as the internal voltage VI as the voltage VO1, the same voltage as the internal voltage VI as the voltage VO2, and a voltage 1.5 times as high as the internal voltage VI as the voltage VO3. As a result, the voltage levels of the voltages VO1, VO2, VO3 outputted from the power supply circuit 3 become Va*, 2Va*, and 3Va*, respectively.

In configurations in FIGS. 3, 4, 8A, 8B, 9 and 10, they are substantially the same in that the internal voltage outputted from the voltage generating circuit 12 and the multiplication rate at which the voltage step-up/down circuit 13 performs the voltage multiplication are switched, according to the output from the voltage comparison circuit 11.

Figure 11:
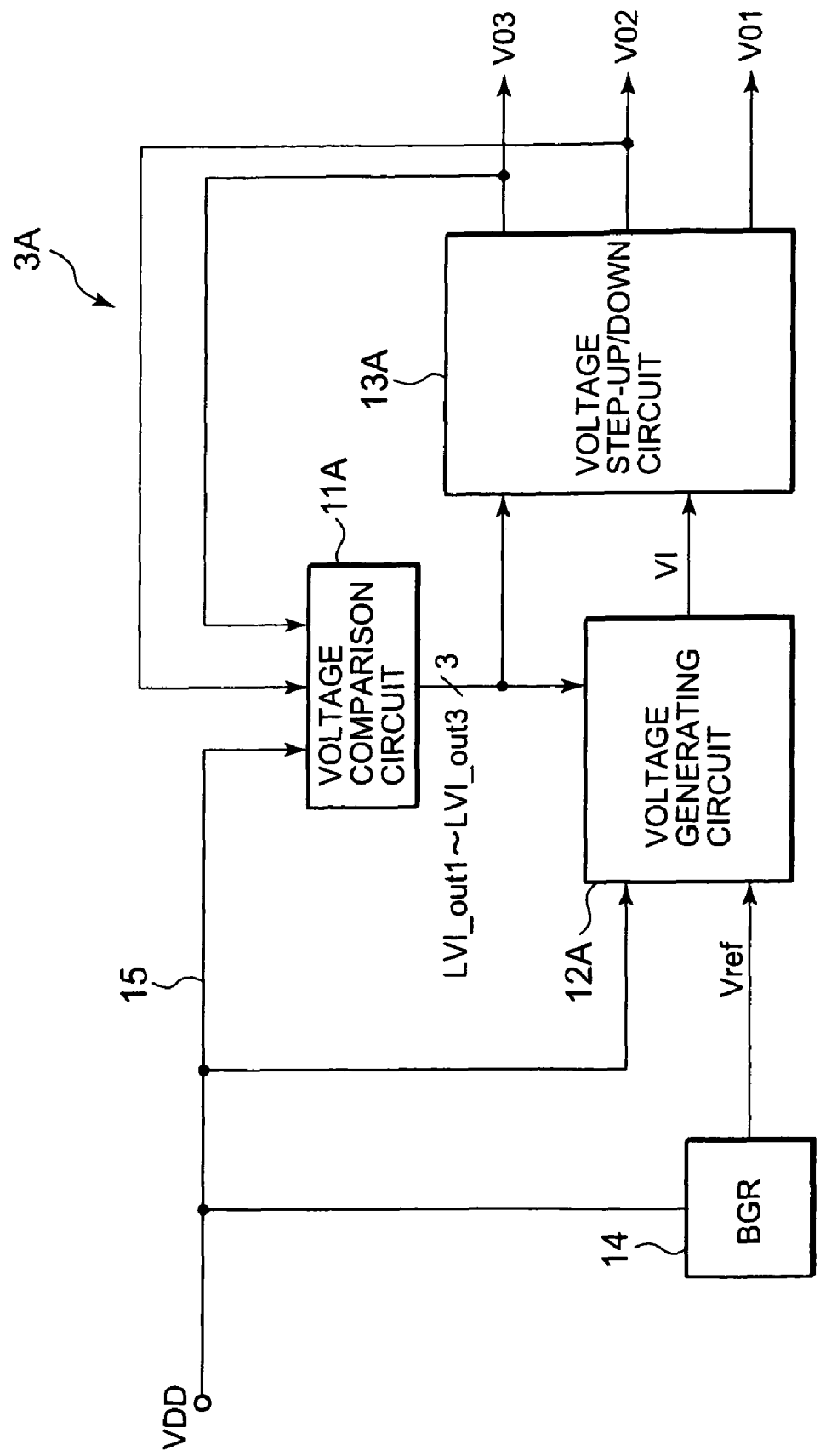
FIG. 11 is a block diagram illustrating a configuration of a power circuit in further another embodiment of the present invention.

FIG. 11 is a block diagram illustrating a configuration of a power supply circuit 3A of another embodiment of the present invention. In the power supply circuit 3A in FIG. 11, an operation of the voltage generating circuit 12A and that of a voltage step-up/down circuit 13A are controlled according to comparison results between the voltage VO3 and the power supply voltage VDD in addition to a comparison result between the voltage VO2 and the power supply voltage VDD. The comparison results between each of voltages VO2 and VO3 and the power supply voltage VDD are transmitted to the voltage generating circuit 12A and the voltage step-up/down circuit 13A by control signals LVI_out1 to LVI_out3.

To be specific, when VDD<VO2 is established, the voltage generating circuit 12A sets the voltage level of the internal voltage VI to Va*. Meanwhile, the voltage step-up/down circuit 13A outputs the same voltage as the internal voltage VI as the voltage VO1, a voltage twice as high as the internal voltage VI as the voltage VO2, and a voltage three times as high as the internal voltage VI as the voltage VO3. As a result, the voltage levels of the voltages VO1, VO2, VO3 outputted from the power supply circuit 3A become Va*, 2Va*, and 3Va*, respectively.

Moreover, when VO2<VDD<VO3 is established, the voltage generating circuit 12A sets the voltage level of the internal voltage VI to 2Va*. Meanwhile, the voltage step-up/down circuit 13A outputs a voltage ½ times as high as the internal voltage VI as the voltage VO1, the same voltage as the internal voltage VI as the voltage VO2, and a voltage 1.5 times as high as the internal voltage VI as the voltage VO3. As a result, the voltage levels of the voltages VO1, VO2, VO3 outputted from the power supply circuit 3A become Va*, 2Va*, and 3Va*, respectively.

Furthermore, when VO3<VDD is established, the voltage generating circuit 12A sets the voltage level of the internal voltage to 3Va*. Meanwhile, the voltage step-up/down circuit 13A outputs a voltage ⅓ times as high as the internal voltage VI as the voltage VO1, a voltage ⅔ times as high as the internal voltage VI as the voltage VO2, and the same voltage as the internal voltage VI as the voltage VO3. As a result, the voltage levels of the voltages VO1, VO2, VO3 outputted from the power supply circuit 3A become Va*, 2Va*, and 3Va*, respectively.

As mentioned above, even in the configuration in FIG. 11, when the power supply voltage VDD is high, the multiplication rate of the voltage step-up/down circuit 13A is reduced, thereby decreasing current consumption of the power supply that generates the power voltage VDD. On the other hand, when the power supply voltage VDD is low, the multiplication rate of the voltage step-up/down circuit 13A is increased, so that voltages VO1 to VO3, each having a desired voltage level, are generated. In other words, the power supply circuit 3A can be operated with a low power supply voltage. Particularly, in the configuration in FIG. 11, when the power supply voltage VDD is higher than the voltage VO3, the internal voltage VI is set to voltage 3Va* to reduce the multiplication rate of the voltage step-up/down circuit 13A is reduced to make it possible to further decrease current consumption of the power supply that generates the power voltage VDD.

The following will specifically explain the configurations and operations of the voltage comparison circuit 11A, the voltage generating circuit 12A, and the voltage step-up/down circuit 13A of the power supply circuit 3A in FIG. 11.

Figure 12:
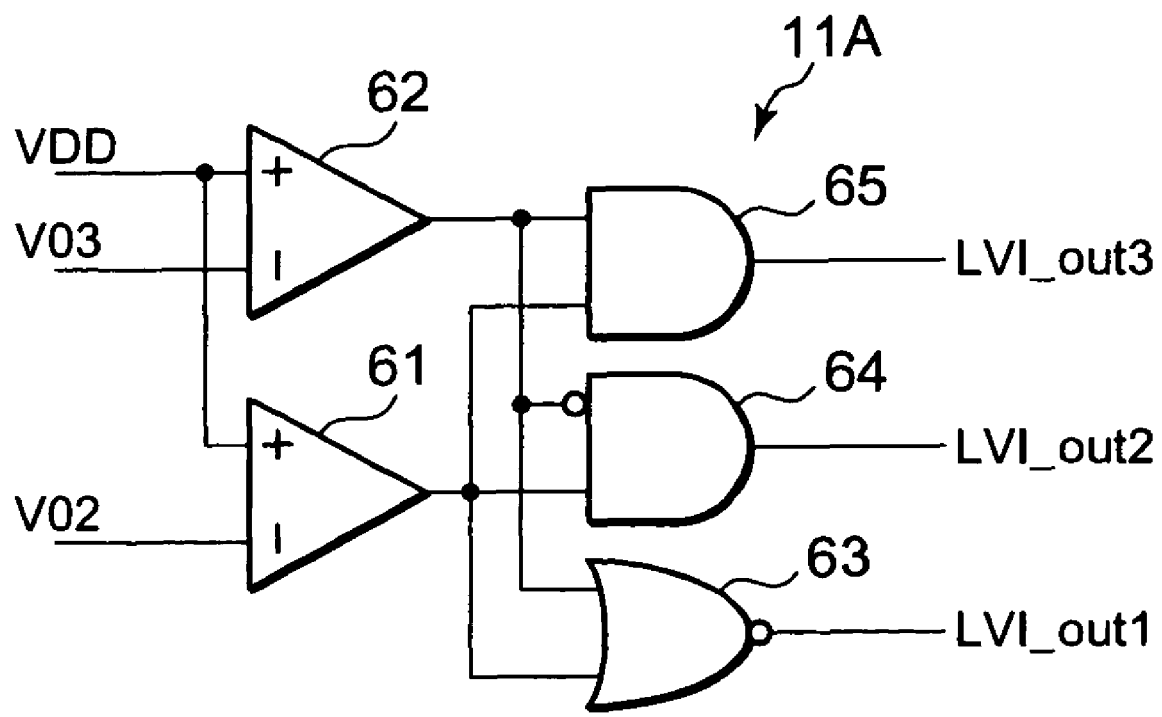
FIG. 12 is a circuit diagram illustrating an example of a configuration of a voltage comparison circuit of the power supply circuit in FIG. 11.

FIG. 12 is a circuit diagram illustrating an example of the configuration of the voltage comparison circuit 11A. The voltage comparison circuit 11A selectively sets only one of the control signals LVI_out1 to LVI_out3 to a "High" level and other control signals to "Low" levels according to the comparison results between the voltage VO2 and the power supply voltage VDD as well as between the voltage VO3 and the power supply voltage VDD. To be specific, when VDD<VO2 is established, the control signal LVI_out1 is set to a "High" level. When VO2<VDD<VO3 is established, the control signal LVI_out2 is set to a "High" level. When VO3<VDD is established, the control signal LVI_out3 is set to a "High" level.

In one embodiment, the voltage comparison circuit 11A includes two comparators 61 and 62, a NOR circuit 63 and AND circuits 64 and 65. The power supply voltage VDD is inputted to a non-inverting input of the comparator 61, and the voltage VO2 is inputted to an inverting input thereof. The power supply voltage VDD is inputted to a non-inverting input of the comparator 62, and the voltage VO3 is inputted to an inverting input thereof. An output of the comparator 61 is connected to a first input of each of the NOR circuit 63, the AND circuits 64 and 65. An output of the comparator 62 is connected to a second input of each of the NOR circuit 63, the AND circuits 64 and 65. Herein, the second input (the input to which the output of the comparator 62 is connected) of the AND circuit 64 is an inverting input. The control signals LVI_out1 to LVI_out3 are outputted from the outputs of the NOR circuit 63, and the AND circuits 64 and 65, respectively. One skilled in the art will understand that the operation of the voltage comparator circuit 11A is implemented with the aforementioned configuration. The generated control signals LVI_out1 to LVI_out3 are supplied to both the voltage generating circuit 12A and the voltage step-up/down circuit 13A.

Figure 13:
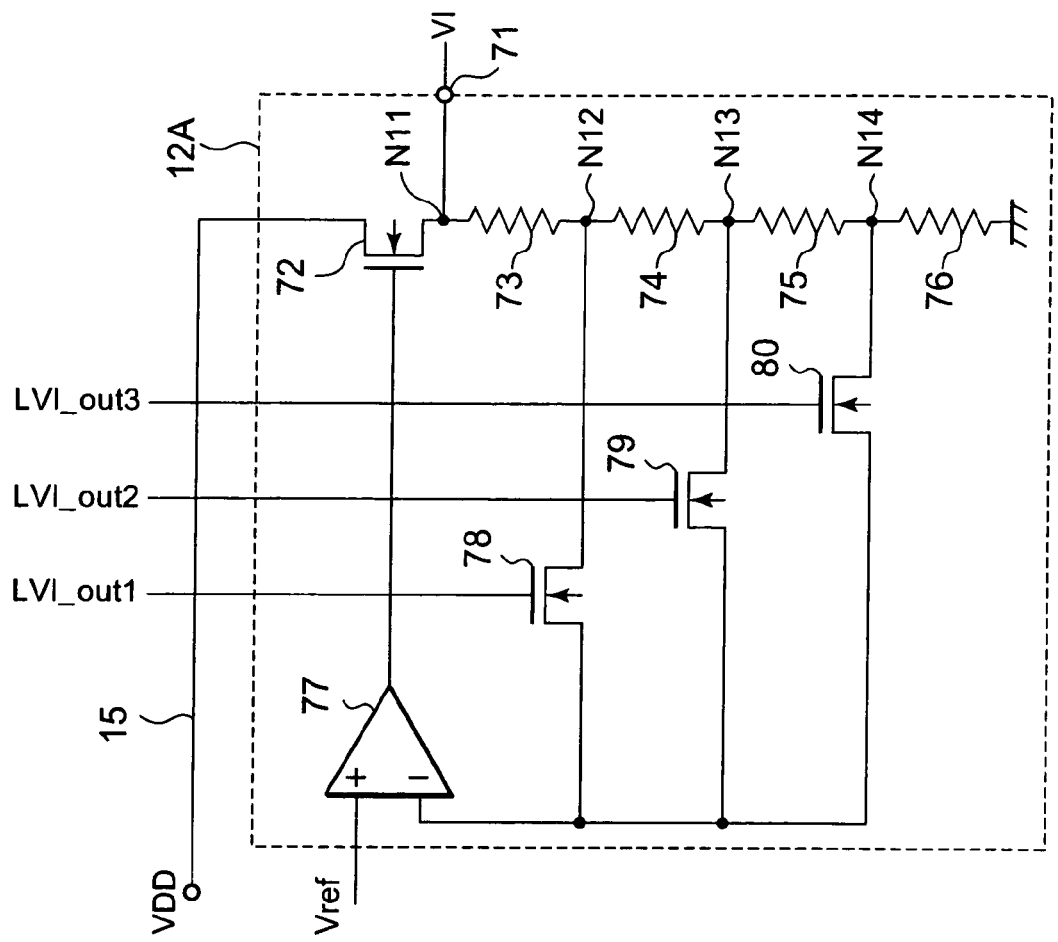
FIG. 13 is a circuit diagram illustrating an example of a configuration of a voltage generating circuit of the power supply circuit in FIG. 11.

FIG. 13 is a circuit diagram illustrating an example of the configuration of the voltage generating circuit 12A. The voltage generating circuit 12A switches the voltage level of the internal voltage VI to three stages according to the control signals LVI_out1 to LVI_out 3 supplied from the voltage generating circuit 12A. To be specific, when the control signal LVI_out1 is a "High" level (namely, when VDD<VO2 is established), the voltage generating circuit 12A sets the internal voltage VI to voltage Va*. When the control signal LVI_out2 is a "High" level (namely, when VO2<VDD<VO3 is established), the voltage generating circuit 12A sets the internal voltage VI to voltage 2Va*. When the control signal LVI_out3 is a "High" level (namely, when VO3<VDD is established), the voltage generating circuit 12A sets the internal voltage VI to voltage 3Va*.

In one embodiment, the voltage generating circuit 12A includes an output terminal 71, an NMOS transistor 72, resistance elements 73 to 76, an operational amplifier 77, and NMOS transistors 78 to 80. The NMOS transistor 72 is connected between a node N11 and the power line 15 to which the power supply voltage VDD is supplied, and the node N11 is connected to the output terminal 71. The resistance elements 73 to 76 are connected in series between the node N11 and the ground terminal. A connection node N12 of the resistance elements 73 and 74 is, connected to an inverting input of the operational amplifier 77 through the NMOS transistor 78. Likewise, a connection node N13 of the resistance elements 74 and 75 is connected to the inverting input of the operational amplifier 77 through the NMOS transistor 79, and a connection node N14 of the resistance elements 75 and 76 is connected to the inverting input of the operational amplifier 77 through the NMOS transistor 80. The control signals LVI_out1 to LVI_out3 are supplied to gates of the NMOS transistors 78 to 80, respectively. A reference voltage Vref is supplied to a non-inverting input of the operational amplifier 77 from the band-gap reference circuit 14. A non-inverting output of the operational amplifier 77 is connected to a gate of the NMOS transistor 72.

Resistance values of the resistance elements 73 to 76 are adjusted to satisfy the following conditions:

(1) When the internal voltage VI is equal to voltage Va*, the voltage of the connection node N12 becomes equal to the reference voltage Vref.

(2) When the internal voltage VI is equal to voltage 2Va*, the voltage of the connection node N13 becomes equal to the reference voltage Vref.

(3) When the internal voltage VI is equal to voltage 3Va*, the voltage of a connection node N14 becomes equal to the reference voltage Vref.

One skilled in the art will understand that the operation of the voltage generating circuit 12A is implemented with the aforementioned configuration. For example, when the control signal LVI_out1 is set to a "High" level, the connection node N12 is electrically connected to the inverting input of the operational amplifier 77. As a result, the gate voltage of the NMOS transistor 72 is controlled by the operational amplifier 77 such that the voltage of the connection node N12 becomes equal to the reference voltage Vref, that is, the internal voltage VI becomes equal to voltage Va*. Likewise, when the control signals LVI_out2 and LVI_out3 are set to a "High" level, the gate voltage of the NMOS transistor 72 is controlled such that the internal voltage VI becomes equal to voltage 2Va* and 3Va*.

Figure 14:
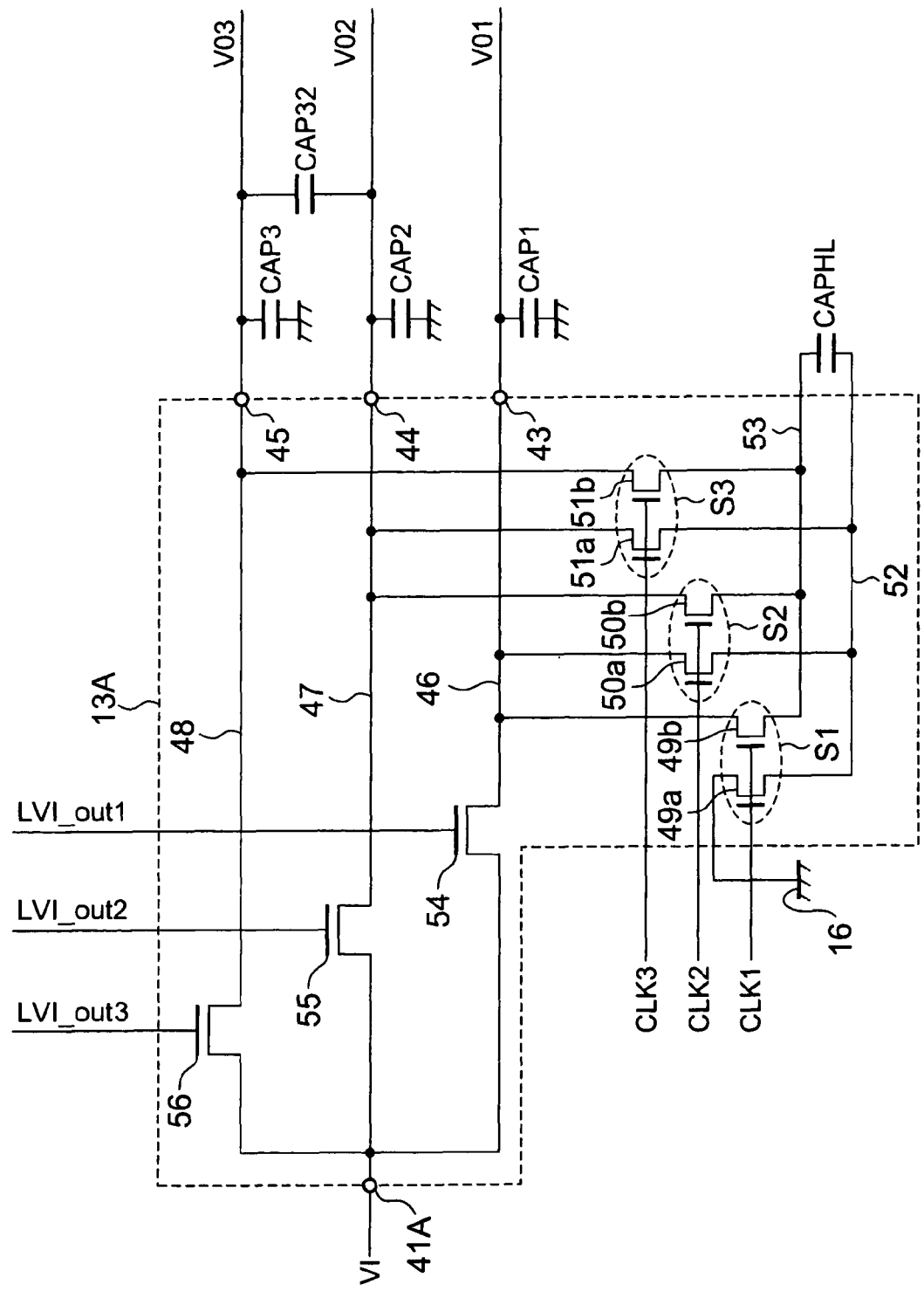
FIG. 14 is a circuit diagram illustrating an example of a voltage step-up/down circuit of the power supply circuit in FIG. 11.

FIG. 14 is a view illustrating one example of the configuration of the voltage step-up/down circuit 13A. The voltage step-up/down circuit 13A in FIG. 14 has the configuration schematically similar to the voltage step-up/down circuit 13 in FIG. 4. It should be noted that changes are made to the voltage step-up/down circuit 13A so as to switch the multiplication rate of voltage multiplication according to the control signals LVI_out1 to LVI_out3.

The following will explain the difference between the voltage step-up/down circuit 13A in FIG. 14 and the voltage step-up/down circuit 13 in FIG. 4. In the voltage step-up/down circuit 13A, a single common input terminal 41A is provided and the internal voltage VI is supplied to the common input terminal 41A. The common input terminal 41A is connected to the internal wire 46 through the NMOS transistor 54, connected to the internal wire 47 through the NMOS transistor 55, and connected to the internal wire 48 through the NMOS transistor 56. Herein, the internal wires 46 to 48 are wires connected to the output terminals 43 to 45 within the voltage step-up/down circuit 13A, respectively. The control signals LVI_out1 to LVI_out3 are supplied to the NMOS transistors 54 to 56, respectively. The connection relationship between the common input terminal 41A and each of the internal wires 46 to 48 is switched according to the control signals LVI_out1 to LVI_out3. The connection relationship between the common input terminal 41A and each of the internal wires 46 to 48 is switched, thereby changing the multiplication rate of voltage multiplication.

The other configurations of the voltage step-up/down circuit 13A in FIG. 14 are the same as those of the voltage step-up/down circuit 13A in FIG. 4. It should be noted that a capacitor CAP 32 is used to be connected between the output terminals 44 and 45. The capacitor CAP 32 has the same capacitance as that of each of the capacitors CAP 1 to CAP 3 and CAPHL.

FIG. 15 is a view specifically explaining the operation of the voltage step-up/down circuit 13A in FIG. 14.

(1) A Case where VDD<VO2 is Established

When VDD<VO2 is established, the control signal LVI_out1 is set to a "High" and the internal wire 46 is driven by the internal voltage VI. In this case, the voltage step-up/down circuit 13A operates as follows: In the phase "1", the capacitors CAPHL and the CAP 1 are connected to the internal wires 46 in parallel and charged to voltage VI. In the phase "2", an electrical charge is moved to the capacitor CAP 2 from the capacitor CAPHL such that the voltage of the capacitor CAP 2 is equal to the sum of the voltages of the capacitor CAPHL and the capacitor CAP 1. In the phase "3", an electrical charge of the capacitor CAPHL is moved to the capacitors CAP 3 and CAP 32 such that the voltage of the capacitor CAP 3 is equal to the sum of the voltages of the capacitor CAP 2 and the capacitor CAPHL, and the voltage of the capacitor CAP 32 is equal to the voltage of the capacitor CAPHL. When operations of the phases "1" to "3" are repeated and movement of the electrical charge is finally stopped, the capacitor CAP 1 and the CAPHL are charged to voltage VI, the capacitor CAP 2 is charged to voltage of 2×VI, and the capacitor CAP 3 is charged to voltage of 3×VI. That is, the voltage step-up/down circuit 13A outputs the same voltage as the internal voltage VI as the voltage VOI, a voltage twice as high as the internal voltage VI as the voltage VO2, and a voltage three times as high as the internal voltage VI as the voltage VO3.

Herein, when VDD<VO2 is established, the internal voltage VI is controlled so as to be equal to the voltage Va*, with the result that voltages VO1 to VO3 are generated so as to establish the following relationships:

$$VO1 = VI = Va^*, \tag{10a}$$

$$VO2 = 2 \times VI = 2 \times Va^*, \text{ and} \tag{10b}$$

$$VO3 = 3 \times VI = 3 \times Va^*. \tag{10c}$$

(2) A Case where VO2<VDD<VO3 is Established

A case where VO2<VDD<VO3 is established, the control signal LVI_out2 is set to a "High" and the internal wire 47 is driven by the internal voltage VI. In this case, the voltage step-up/down circuit 13A operates as follows:

In the phase "2", the capacitor CAP 2 connected to the internal wires 47 is charged to voltage VI. At this time, the capacitors CAPHL and CAP 1 are connected in series to each other, and therefore the capacitors CAPHL and the CAP 1 are charged to voltage VI/2. In the phase "3", an electrical charge of the capacitor CAPHL is moved to the capacitors CAP 3 and CAP 32 such that the voltage of the capacitor CAP 3 is equal to the sum of the voltages of the capacitor CAP 2 and the capacitor CAPHL, and the voltage of the capacitor CAP 32 is equal to the voltage of the capacitor CAPHL. In the phase "1", the capacitors CAPHL and the CAP 1 are connected to each other in parallel and the electrical charge is moved between the capacitors CAPHL and the CAP 1 such that the voltage of the capacitor CAPHL and the voltage of the CAP 1 are equal to each other. When operations of the phases "1" to "3" are repeated and movement of the electrical charge is finally stopped, the capacitor CAP 1 and the CAPHL are charged to voltage VI/2, the capacitor CAP 2 is charged to voltage VI, and the capacitor CAP 3 is charged to voltage of 1.5×VI. That is, the voltage step-up/down circuit 13A outputs a voltage ½ times as high as the internal voltage VI as the voltage VO1, the same voltage as the internal voltage VI as the voltage VO2, and a voltage 1.5 times as high as the internal voltage VI as the voltage VO3.

Herein, when VO2<VDD<VO3 is established, the internal voltage VI is controlled so as to be equal to the voltage 2Va*, with the result that voltages VO1 to VO3 are generated so as to establish the following relationships:

$$VO1 = \tfrac{1}{2} \times VI = Va^*, \tag{11a}$$

$$VO2 = VI = 2 \times Va^*, \text{ and} \tag{11b}$$

$$VO3 = 1.5 \times VI = 3 \times Va^*. \tag{11c}$$

(3) A Case where VO3<VDD is Established

A case where VO3<VDD is established, the control signal LVI_out3 is set to a "High" and the internal wire 48 is driven by the internal voltage VI. In this case, the voltage step-up/down circuit 13A operates as follows: In the phase "3", the capacitor CAP 3 is charged to voltage VI. In addition, the capacitors CAPHL and CAP 32 are connected in parallel between the internal wires 47 and 48 and the capacitor CAP 2 is connected between the internal wire 47 and the ground terminal, and therefore the capacitor CAPHL is charged to voltage VI/3. In the phase "1", the capacitors CAPHL and the CAP 1 are connected to each other in parallel and the electrical charge is moved between the capacitors CAPHL and the CAP 1 such that the voltages of the capacitor CAPHL and the capacitor CAP 1 are equal to each other. In the phase "2", an electrical charge is moved to the capacitors CAP 2 from the capacitor CAPHL such that the voltage of the capacitor CAP 2 is equal to the sum of the voltages of the capacitor CAPHL and the capacitor CAP 1. When operations of the phases "1" to "3" are repeated and movement of the electrical charge is finally stopped, the capacitor CAP 1 and the CAPHL are charged to voltage of (⅓)×VI, the capacitor CAP 2 is charged to voltage of (⅔)×VI, and the capacitor CAP 3 is charged to voltage VI. That is, the voltage step-up/down circuit 13A outputs a voltage ⅓ times as high as the internal voltage VI as the voltage VO1, a voltage ⅔ times as high as the internal voltage VI as the voltage VO2, and the same voltage as t the internal voltage VI as the voltage VO3.

Herein, when VO3<VDD is established, the internal voltage VI is controlled so as to be equal to the voltage 3Va*, with the result that voltages VO1 to VO3 are generated so as to establish the following relationships:

$$VO1 = \tfrac{1}{3} \times VI = Va^*, \tag{12a}$$

$$VO2 = \tfrac{2}{3} \times VI = 2 \times Va^*, \text{ and} \tag{12b}$$

$$VO3 = VI = 3 \times Va^*. \tag{12c}$$

As is understood from the above explanation, the power supply circuit 3A operates so as to establish the following equations even in either of the above cases (1) to (3):

$$VO1 = Va^*, \tag{1a}$$

$$VO2 = 2 \times Va^*, \text{ and} \tag{1b}$$

$$VO3 = 3 \times Va^*. \tag{1c}$$

At this time, when the power supply voltage VDD is high, the multiplication rate of the voltage step-up/down circuit 13A is reduced, thereby decreasing current consumption of the power supply that generates the power voltage VDD. On the other hand, when the power supply voltage VDD is low, the multiplication rate of the voltage step-up/down circuit 13A is increased, so that voltages VO1 to VO3, each having a desired voltage level, are generated. In other words, the power supply circuit 3A in FIG. 11 can be operated even if the power supply voltage VDD is low.

Although the power supply circuit of the embodiments of the present invention has been variously explained as above, it should be understood the invention is not limited to the above embodiments. Various modifications may be possible to build the power supply circuit of the present invention. The power supply circuit of the present invention is applicable to various devices other than the liquid crystal display device. Moreover, the internal voltage, which is generated by the voltage generating circuit, and the multiplication rate of voltage multiplication in the voltage step-up/down circuit may be appropriately changed.

It is apparent that the present invention is not limited to the above embodiments, but may be modified and changed without departing from the scope and sprit of the invention.

What is claimed is:

1. A power supply circuit comprising:
   a voltage generating circuit that generates an internal voltage from a power supply voltage;
   a voltage multiplication circuit that receives the internal voltage and performs voltage multiplication of the received internal voltage to thereby generate a plurality of output voltages each having a different voltage level; and
   a voltage comparison circuit that compares at least one of the plurality of output voltages with the power supply voltage, wherein
   the voltage generating circuit is configured to switch the voltage level of the internal voltage in response to an output of the voltage comparison circuit, and
   a multiplication rate of voltage multiplication by the voltage multiplication circuit is switched according to the output of the voltage comparison circuit.

2. The power supply circuit according to claim 1, wherein
   the voltage multiplication circuit is configured to generate the plurality of output voltages by multiplying the received internal voltage by a first multiplication rate when the internal voltage has a first voltage level, and
   the voltage multiplication circuit is configured to generate the plurality of output voltages by multiplying the received internal voltage by a second multiplication rate higher than the first multiplication rate when the internal voltage has a second voltage level higher than the first voltage level.

3. The power supply circuit according to claim 2, wherein
   the plurality of output voltages includes:
      a first output voltage; and
      a second output voltage higher than the first output voltage,
   the second voltage level is n times as high as the first voltage level (n is a number larger than 1),
   the voltage multiplication circuit is configured to output, as the first output voltage, the same voltage as the internal voltage and to output, as the second output voltage, a voltage n times as high as the internal voltage when the received internal voltage has the first voltage level, and
   the voltage multiplication circuit is configured to output, as the first output voltage, a voltage 1/n times as high as the internal voltage and to output, as the second output voltage, the same voltage as the internal voltage when the received internal voltage has the second voltage level.

4. The power supply circuit according to claim 3, wherein
   in response to the output of the voltage comparison circuit, the voltage generating circuit switches between an operation for supplying the internal voltage having the first voltage level to a first input of the voltage multiplication circuit, and an operation for supplying the internal voltage having the second voltage level to a second input of the voltage multiplication circuit, and the voltage multiplication circuit switches the multiplication rate depending on which of the first input and the second input is supplied with the internal voltage.

5. The power supply circuit according to claim 4, wherein
   the voltage multiplication circuit is configured to maintain a ratio between the voltage of the first input and the voltage of the second input at a predetermined value, and
   the voltage generating circuit includes:
      a first output connected to the first input and configured to output the internal voltage having the first voltage level;
      a second output connected to the second input and configured to output the internal voltage having the second voltage level; and
      two resistance elements connected in series between the first output and the second output, and
   the voltage generating circuit is configured to be capable of controlling both voltages of the first output and the second output by feeding back a voltage of a connection node of the two resistance elements.

6. The power supply circuit according to claim 4, wherein
   the voltage multiplication circuit is configured to maintain a ratio between the voltage of the first input and the voltage of the second input at a predetermined value, and
   the voltage generating circuit includes:
      a first output connected to the first input and configured to output the internal voltage having the first voltage level; and
      a second output connected to the second input and configured to output the internal voltage having the second voltage level,
   the voltage generating circuit is configured to be capable of controlling both voltages of the first output and the second output by feeding back a voltage of one of the first output and the second output, and
   the other one of the first output and the second output is electrically separated from the ground terminal.

7. The power supply circuit according to claim 5, wherein the first output and the second output of the voltage generating circuit are electrically separated from a ground terminal.

8. The power supply circuit according to claim 5, wherein
   the voltage generating circuit further includes:
      a first PMOS transistor connected between the first output and a power supply line to which the power supply voltage is supplied;
      a second PMOS transistor connected in series between the power supply line and the second output;
      a selection circuit section that selects, in response to the output of the voltage comparator circuit, whether to connect the power supply line to the first output through the first PMOS transistor, or to connect the power supply line to the second output through the second PMOS transistor; and
      a control circuit section that controls a gate voltage of the first PMOS transistor and a gate voltage of the second PMOS transistor, in response to the voltage of the connection node.

9. The power supply circuit according to claim 7, wherein
   the voltage generating circuit further includes:
      a first PMOS transistor connected between the first output and a power supply line to which the power supply voltage is supplied;
      a second PMOS transistor connected in series between the power supply line and the second output;
      a selection circuit section that selects, in response to the output of the voltage comparator circuit, whether to connect the power supply line to the first output through the first PMOS transistor, or to connect the power supply line to the second output through the second PMOS transistor; and a control circuit section that controls a gate voltage of the first PMOS transistor and a gate voltage of the second PMOS transistor, in response to the voltage of the connection node.

10. The power supply circuit according to claim 2, wherein in response to the output of the voltage comparison circuit,
the voltage generating circuit switches between an operation for supplying the internal voltage having the first voltage level to a first input of the voltage multiplication circuit, and an operation for supplying the internal voltage having the second voltage level to a second input of the voltage multiplication circuit, and the voltage multiplication circuit switches the multiplication rate depending on which of the first input and the second input is supplied with the internal voltage.

11. The power supply circuit according to claim 10, wherein
the voltage multiplication circuit is configured to maintain a ratio between the voltage of the first input and the voltage of the second input at a predetermined value, and
the voltage generating circuit includes:
a first output connected to the first input and configured to output the internal voltage having the first voltage level;
a second output connected to the second input and configured to output the internal voltage having the second voltage level; and
two resistance elements connected in series between the first output and the second output, and
the voltage generating circuit is configured to be capable of controlling both voltages of the first output and the second output by feeding back a voltage of a connection node of the two resistance elements.

12. The power supply circuit according to claim 10, wherein
the voltage multiplication circuit is configured to maintain a ratio between the voltage of the first input and the voltage of the second input at a predetermined value, and
the voltage generating circuit includes:
a first output connected to the first input and configured to output the internal voltage having the first voltage level; and
a second output connected to the second input and configured to output the internal voltage having the second voltage level, the voltage generating circuit is configured to be capable of controlling both voltages of the first output and the second output by feeding back a voltage of one of the first output and the second output, and the other one of the first output and the second output is electrically separated from the ground terminal.

13. The power supply circuit according to claim 11, wherein the first output and the second output of the voltage generating circuit are electrically separated from a ground terminal.

14. The power supply circuit according to claim 11, wherein the voltage generating circuit further includes:
a first PMOS transistor connected between the first output and a power supply line to which the power supply voltage is supplied;
a second PMOS transistor connected in series between the power supply line and the second output;
a selection circuit section that selects, in response to the output of the voltage comparator circuit, whether to connect the power supply line to the first output through the first PMOS transistor, or to connect the power supply line to the second output through the second PMOS transistor; and
a control circuit section that controls a gate voltage of the first PMOS transistor and a gate voltage of the second PMOS transistor, in response to the voltage of the connection node.

15. The power supply circuit according to claim 13, wherein the voltage generating circuit further includes:
a first PMOS transistor connected between the first output and a power supply line to which the power supply voltage is supplied;
a second PMOS transistor connected in series between the power supply line and the second output;
a selection circuit section that selects, in response to the output of the voltage comparator circuit, whether to connect the power supply line to the first output through the first PMOS transistor, or to connect the power supply line to the second output through the second PMOS transistor; and
a control circuit section that controls a gate voltage of the first PMOS transistor and a gate voltage of the second PMOS transistor, in response to the voltage of the connection node.

* * * * *